Oct. 31, 1944.   F. A. GROSS   2,361,396
VIBRATION FATIGUE TESTING MACHINE
Filed Oct. 26, 1937   6 Sheets-Sheet 1
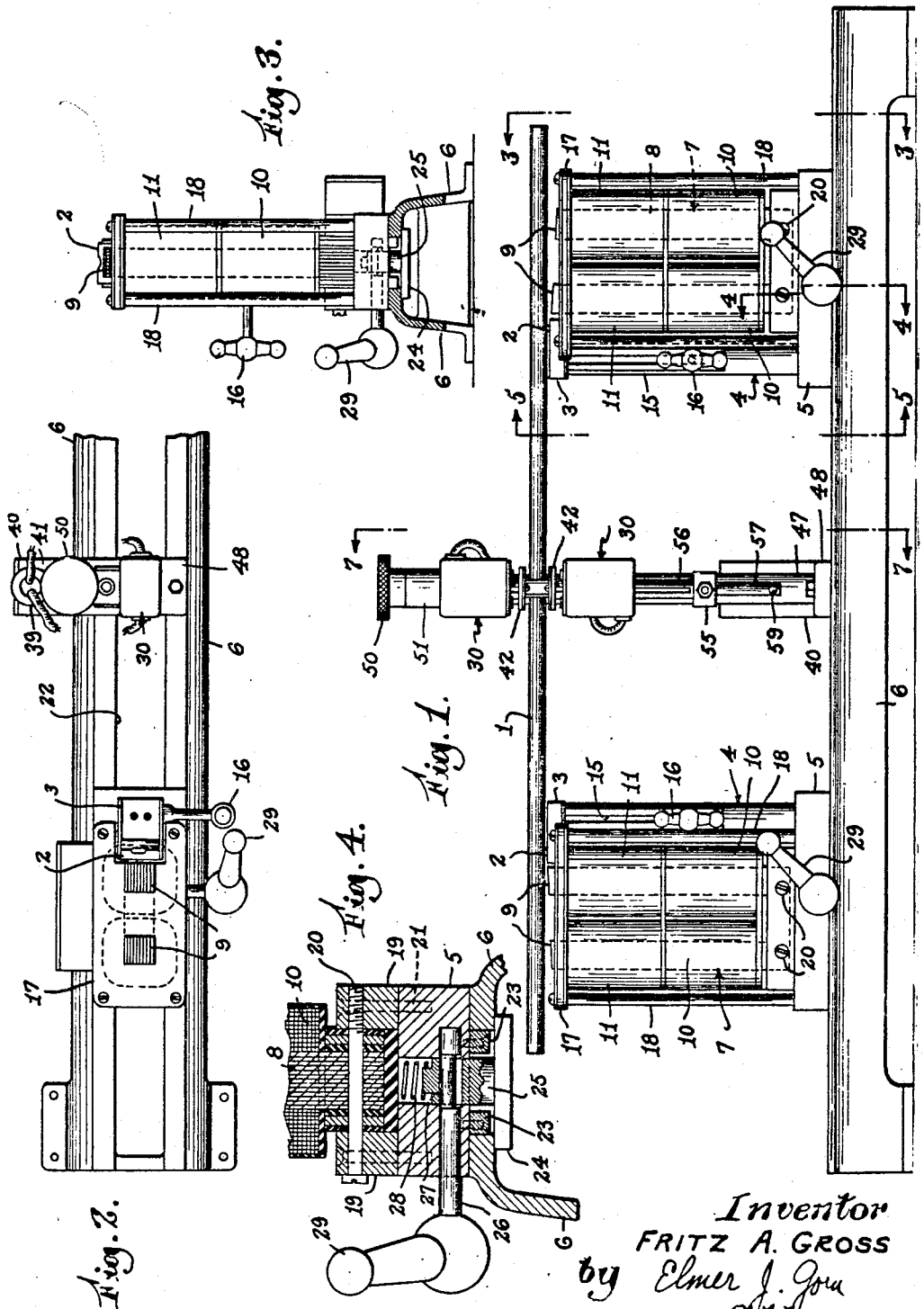
Inventor
FRITZ A. GROSS
by Elmer J. Gorn
Attorney

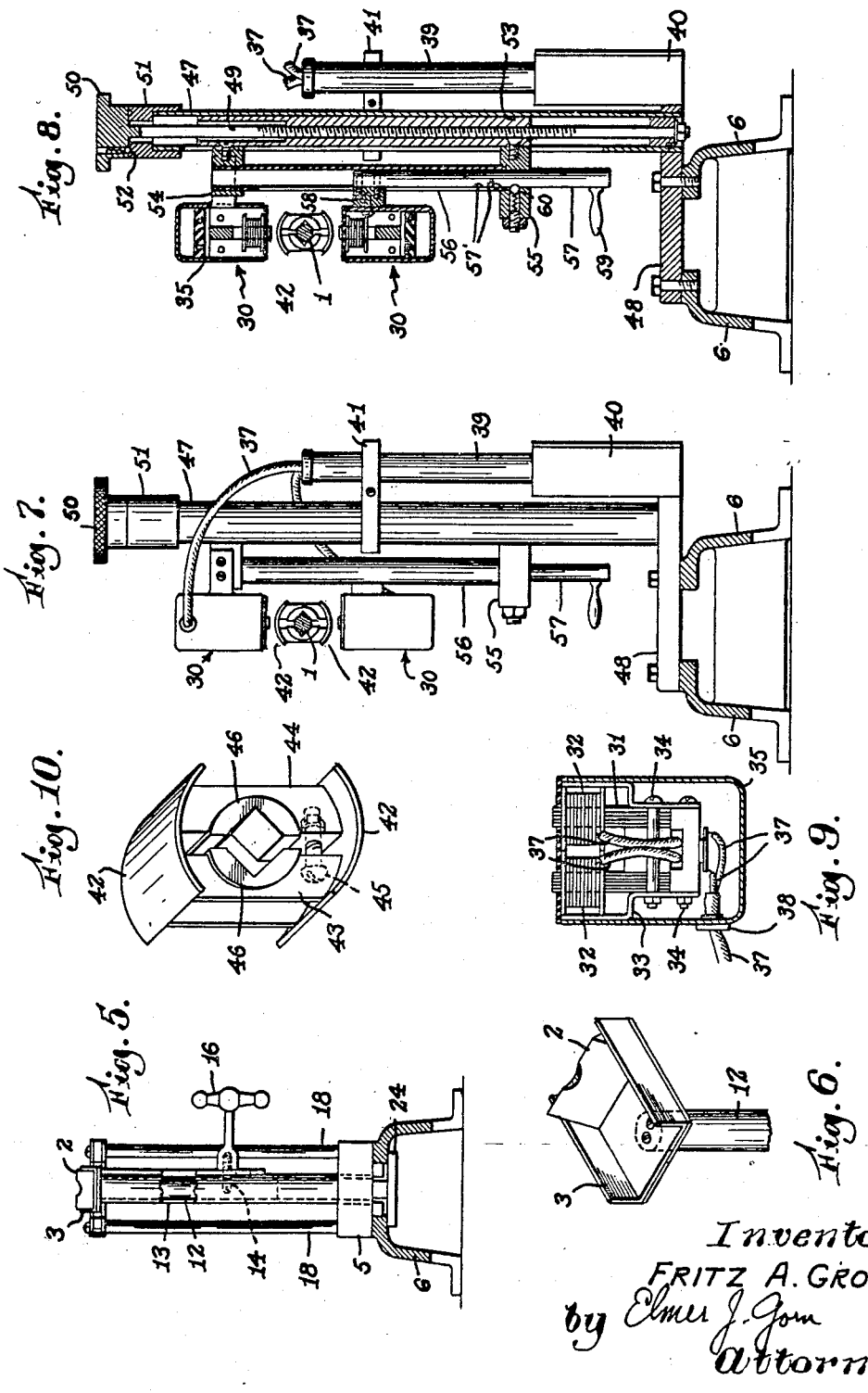

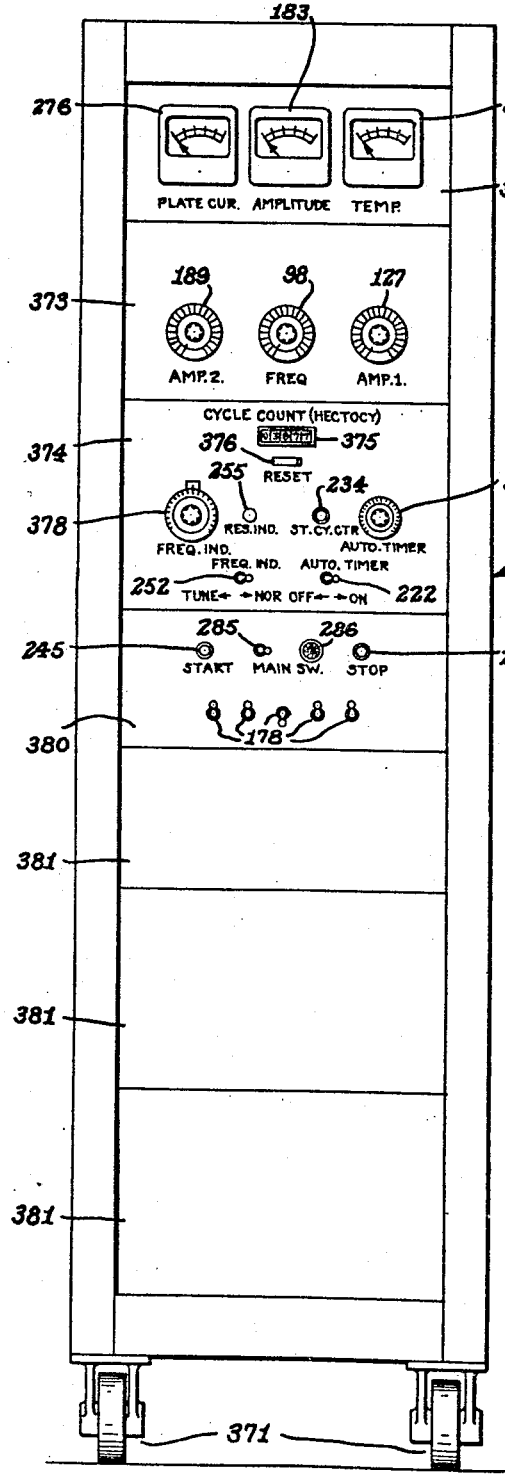
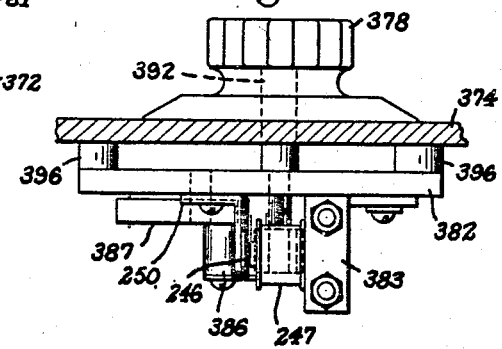
Oct. 31, 1944.  F. A. GROSS  2,361,396
VIBRATION FATIGUE TESTING MACHINE
Filed Oct. 26, 1937  6 Sheets-Sheet 3
Fig. 11.
Fig. 13.
Fig. 12.
Inventor
FRITZ A. GROSS
by Elmer J. Gorn.
Attorney

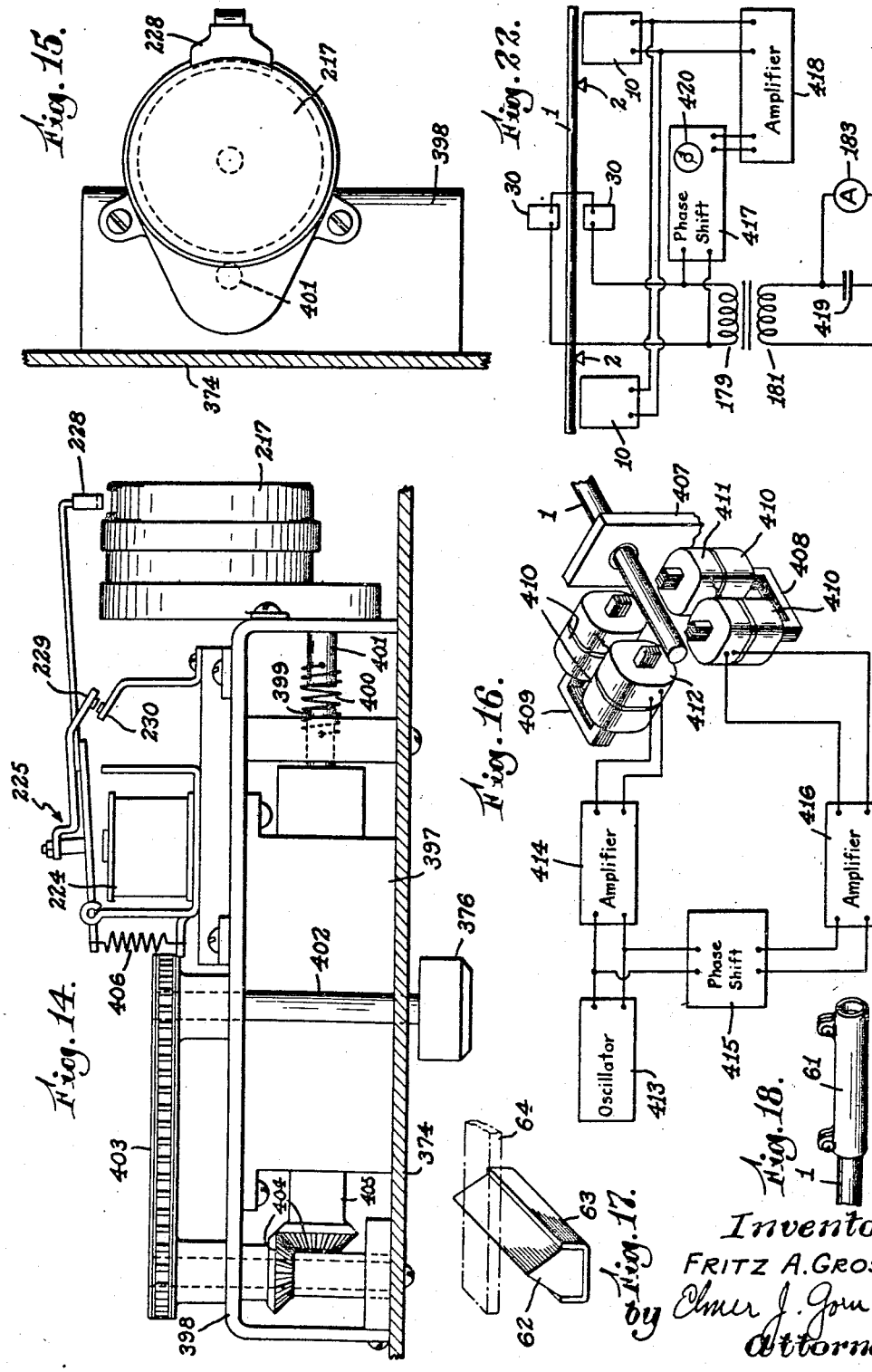

Inventor
Fritz A. Gross
by Elmer J. Goin.
Attorney

Oct. 31, 1944.  F. A. GROSS  2,361,396
VIBRATION FATIGUE TESTING MACHINE
Filed Oct. 26, 1937  6 Sheets-Sheet 6

Inventor
FRITZ A. GROSS
by Elmer J. Gorn
Attorney

Patented Oct. 31, 1944

2,361,396

UNITED STATES PATENT OFFICE 2,361,396

VIBRATION FATIGUE TESTING MACHINE

Fritz A. Gross, Watertown, Mass., assignor to Raytheon Manufacturing Company, Newton, Mass., a corporation of Delaware Application October 26, 1937, Serial No. 171,049

19 Claims. (Cl. 73—67)

This invention relates to a machine for testing construction materials for various physical properties by subjecting said materials to vibration.

One way of obtaining significant facts about the physical properties of construction materials, such as steel, aluminum, and the like, is to subject a piece of said material to continuous vibrations at the resonance frequency of said piece, and to make various measurements in connection with said vibrations. This may be done by creating an electromagnetic field which varies at the resonance frequency of said piece, and causing said magnetic field to act upon said piece. If the test is run for any appreciable length of time, it is desirable that the frequency of the current fed to the electromagnet shall follow the resonance frequency of the test piece inasmuch as this resonance frequency has a tendency to change during such a test. If the frequency of the current fed to the electromagnet did not vary in this way, either the test piece would no longer be vibrated or else would be subjected to such varying and indeterminate stresses as to make results of the test of very little practical value. Furthermore, it is desirable throughout such a test to maintain the amplitude of vibration of the test piece at a constant value which may be determined at will by the operator. It is only when the amplitude of vibration is maintained at such a fixed value that practically significant results can be secured from such a vibration test.

In accordance with my invention I have devised a machine which accomplishes each of the above desirable purposes.

One of the objects of this invention is to devise a machine for vibrating a test piece by subjecting said piece to a periodically varying magnetic field whose frequency of variation is variable with and accurately fixed by the natural resonance frequency of said piece.

Another object is to provide means for adjusting the amplitude of said vibration to a predetermined value and for automatically maintaining said amplitude at said value throughout the test.

A further object is to provide an electrically-operated indicator for said amplitude, the reading of which is dependent on said amplitude only and is independent of frequency.

A still further object is to devise in such a machine various arrangements, controls, and indicating devices so as to make the operation of such a vibration test easy and to make the results thereof accurate and reliable.

The foregoing and other objects of my invention will be best understood from the following description of exemplifications thereof, reference being had to the accompanying drawings, wherein:

Fig. 1 is a front elevation of the vibrator unit carrying the electromagnets which cause the vibration of the test piece;

Fig. 2 is a top view of the central and left portions of Fig. 1;

Fig. 3 is a section taken along line 3—3 of Fig. 1;

Fig. 4 is an enlarged section taken along line 4—4 of Fig. 1;

Fig. 5 is a section with a portion thereof broken away, and taken along line 5—5 of Fig. 1;

Fig. 6 is a perspective view of a node cushion and its associated support;

Fig. 7 is a section taken along line 7—7 of Fig. 1, showing the pickup assembly which is responsive to the amplitude of vibration of the test piece;

Fig. 8 is a vertical section of the pickup assembly shown in Fig. 7;

Fig. 9 is an enlarged cross-section of one pickup unit;

Fig. 10 is a perspective view of the armature which is mounted on the test piece at the pickup assembly;

Fig. 11 is a front elevation of the cabinet rack carrying the power supply and control units;

Fig. 12 is a view of a tuned reed cut-off relay which is incorporated in my device;

Fig. 13 is a top view of the tuned relay assembly shown in Fig. 12;

Fig. 14 is a bottom view of a cycle counter which is also incorporated in my machine;

Fig. 15 is an end view of a part of the cycle counter;

Fig. 16 is a diagrammatic illustration of a modification of the vibrator coils with which a rotary flexing motion may be imparted to the test piece;

Fig. 17 is a perspective view of a node cushion which is to be used when flat specimens are tested;

Fig. 18 shows a magnetic armature which is to be used when non-magnetic materials are tested in my machine;

Fig. 22 is a diagrammatic illustration of a modification of the ampltiude-indicating means and the vibrator current-generating means.

*Vibrator assembly*

Figure 19:
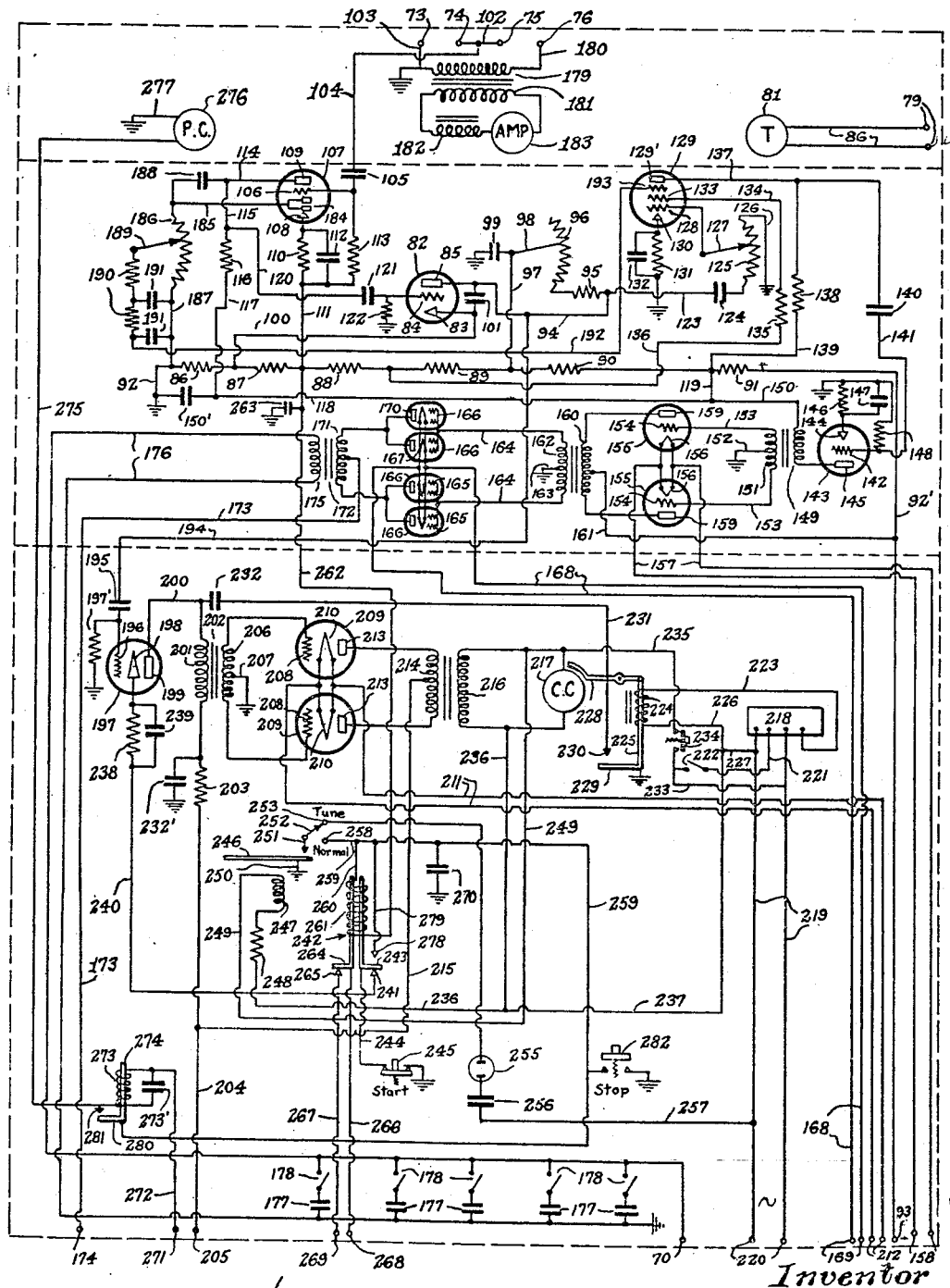
Fig. 19 is a diagrammatic circuit of the oscillator and control elements.

As shown in Figs. 1 to 10, inclusive, a test piece 1, which may be in the form of an elongated cylindrical rod, is supported by a pair of node cushions 2. These node cushions are so adjusted that they contact test piece 1 at the nodal points thereof when said piece is set in vibration. The node cushions 2 are mounted in holders 3 which are supported on the two node standards 4, which in turn are carried by the two carriages 5. Each carriage 5 is carried by the bed frame 6. Each carriage 5 likewise has mounted upon it a vibrator magnet 7 consisting of a generally U-shaped magnetic core 8 having upper pole faces 9 adjacent an outer end of the test piece 1. Upon the magnetic core 8 is mounted a pair of direct current polarizing coils 10 which magnetize the core 8, and acting upon the test piece 1, which in this case is of magnetic material, firmly hold said test piece against the node cushions 2. Each magnetic core 8 also is provided with a pair of alternating current excitation coils 11. The coils 11 are adapted to be supplied with a periodically varying current whose frequency is the same as the resonance frequency of the test piece 1. Under these conditions the test piece 1 will be caused to vibrate at its natural frequency. Under these conditions the central point of the bar 1 will be rapidly flexed back and forth, and at this point the bar, therefore, will be subjected to its maximum stress which will vary periodically at the resonance frequency of said bar. Nodal points will occur where the bar rests upon the node cushions 2, and therefore a minimum of motion will occur at these points.

In order that the test piece 1 may be mounted in its proper relationship with respect to the pole faces 9, the node cushions 2 are vertically adjustable. For this purpose holders 3 are each mounted at the upper end of a stud 12 which in turn is received within a node adjustment tube 13 carried by the carriage 5. A pin 14 secured to the stud 12 extends through a slot 15 in the side of the tube 13, and carries at its outer end a handle 16, the inner end of which may be clamped against the outside of the tube 13. By manipulating the handle 16, the node cushions 2 may be moved up and down, and may be clamped in place wherever desired.

Each magnet 7 is mounted upon its associated carriage 5 by means of the end plates 17, which are fastened at the upper end of the coil standards 18. The standards 18 are mounted at their lower ends on the carriage 5. The end plates 17 in this way hold the magnet 7 down in place on the carriage 5. The lower end of the core 8 of each magnet 7 is secured between two clamping blocks 19 which are clamped on opposite sides of the lower end of said core 8 by means of clamping bolts 20. The blocks 19 are in turn secured to the carriage 5 by means of fastening bolts 21.

In order to accommodate the machine to various lengths of test pieces, the carriages 5 are adjustable along the bed frame 6. When a test piece is mounted upon the machine and is set in vibration, the nodal points thereof are readily observed and the carriages 5 are moved along the bed frame 6 so that the node cushions 2 occur at said nodal points. For this purpose the bed frame 6 is provided with a longitudinal guide slot 22. The lower face of each carriage 5 is provided with a pair of guide blocks 23 which engage the sides of the guide slots 22. In order to clamp each carriage 5 in any predetermined position along the guide slot 22, each of said carriages is provided with a clamping plate 24. This clamping plate is carried by a stud 25 which passes up through the guide slot 22 and which in turn is carried by the cam arm 26. This cam arm 26 is rotatably mounted in the carriage 5. The cam arm 26 has formed thereon a cam 27 which is received in an opening in the stud 25. The cam arm 26 may be rotated by the locking handle 29. When the locking handle is turned in one direction, the cam 27 raises the cam plate 24 and clamps the carriage 5 in position on the bed plate 6. When the locking handle 29 is turned in the other direction, the clamping plate 24 is released and the biasing spring 28 forces it away from the wall of the bed plate 6, thus permitting the carriage 5 to be moved freely along the bed plate to any other desired position.

As previously indicated, it is desirable to controle the amplitude of vibration of the test piece 1, and for this purpose the machine is provided with means responsive to the ampltiude of said vibration. This consists of a pair of pickup units 30 mounted on opposite sides of the test piece 1 at the central portion thereof. This is the place where, as previously indicated, the maximum amplitude of vibration of the test piece 1 and likewise where the maximum stress occur. It is this maximum amplitude which should be measured and which likewise should be kept constant throughout the operation of the test. Each pickup unit consists of a magnetic core 31 which is made of an aluminum nickel cobalt steel alloy. This material has the property of retaining magnetism at a substantially constant value. The magnetic core 31 is therefore magnetized to a predetermined extent. The core 31 is made in a U-shaped form and carries on each leg of the U a pickup coil 32. Clamping members 33 are mounted on the opposite sides of the core 31 and the coils 32, and maintain these elements assembled by means of clamping bolts 34. The unit is surrounded by a casing 35. The pair of coils 32 are connected in series, and an external connection is made thereto by means of the pair of conductors 37 which pass from the casing 35 through an insulating bushing 38. The two pairs of conductors 37 from the two pickup units 30 are led through a tube 39 to a terminal box 40. The external connections, which will be described later, may be made from this terminal box. The terminal box 40 is mounted on a plate 48 which is fastened to the bed plate 6 at substantially the central point thereof. The tube 39 is fastened by means of a clamp 41 secured around the pickup standard tube 47 which likewise is mounted upon the plate 48.

The coils 32 mounted upon the magnetized coils 31 constitute generating coils in which currents responsive to the amplitude of vibration of the test piece 1 may be generated. Since various test pieces will necessarily have different diameters, the currents are generated in the coils 32 by means of a pair of magnetic armatures 42 which are spaced apart a definite and predetermined distance by means of the clamping member 43 to which said armatures are securely fastened.

The armatures 42 also make the operation independent of the material of the test piece. An additional member 44 is provided to cooperate with the clamping member 43, so that the armatures 42 may be clamped around the test piece 1. In order to do this, the clamping members 43 and 44 are provided with clamping bolts 45. The clamping members 43 and 44 are provided with a pair of clamping blocks 46 which engage the test piece 1. These clamping blocks are provided with V-shaped clamping faces. These V-shaped clamping faces accommodate the clamping members to various diameters of test pieces. Also, due to this arrangement, the sides of the test piece 1 where the maximum stresses occur are not engaged by said clamping faces, and thus flexing of said test piece at said places of maximum stress is not interfered with.

The pickup units 30 may be moved up and down as a unit by means of the adjusting screw 49 which is rotatably mounted within the pickup standard tube 47. The upper end of the adjusting screw is provided with a knurled head 50. In order to prevent any vibrations from causing creepage of the adjusting screw 49, the upper end of the tube 47 is provided with a detent block 51 having a series of recesses in the upper face thereof. The adjusting head 50 is provided with a spring-pressed ball 52 which engages in said recesses. Thus, although the adjusting head 50 may be freely turned by hand, it is prevented from moving when subjected to vibration by the engagement of the spring-biased ball 52 in the respective recesses of the detent block 51. The adjusting screw 49 is threaded into the elongated block 53 which at its upper end carries an arm 54 which in turn carries the upper pickup unit 30. The block 53 has also secured to the lower end thereof an arm 55. Between the arms 54 and 55 is mounted the tube 56. The lower pickup unit 30 is mounted by means of an arm 58 on the upper end of an adjusting rod 57 which is slidable in said tube 56. The adjusting rod 57 is provided at its lower end with a handle 59, whereby a vertical adjustment of said rod 57 may be manually produced. Since it is necessary to accurately determine the spacing between the pickup units 30 in order to obtain a measure of the amplitude of vibration of the test piece, the adjusting rod 57 is provided with means whereby it can be moved only into predetermined positions for which the spacing between the pickup units 30 has been accurately determined. Thus the adjusting arm 57 is provided with a plurality of detents 57', and the arm 55 is in turn provided with a spring-biased ball 60 which engages said detents 57'. In order to adjust the spacing between the pickup units 30, the adjusting handle 59 is moved up and down so that the spring-biased ball 60 engages a predetermined detent 57'. In order to adjust both units simultaneously, the adjusting head 50 is rotated, in this way producing a continuous and fine adjustment of the vertical position of said pickup units.

Figures 20, 21:
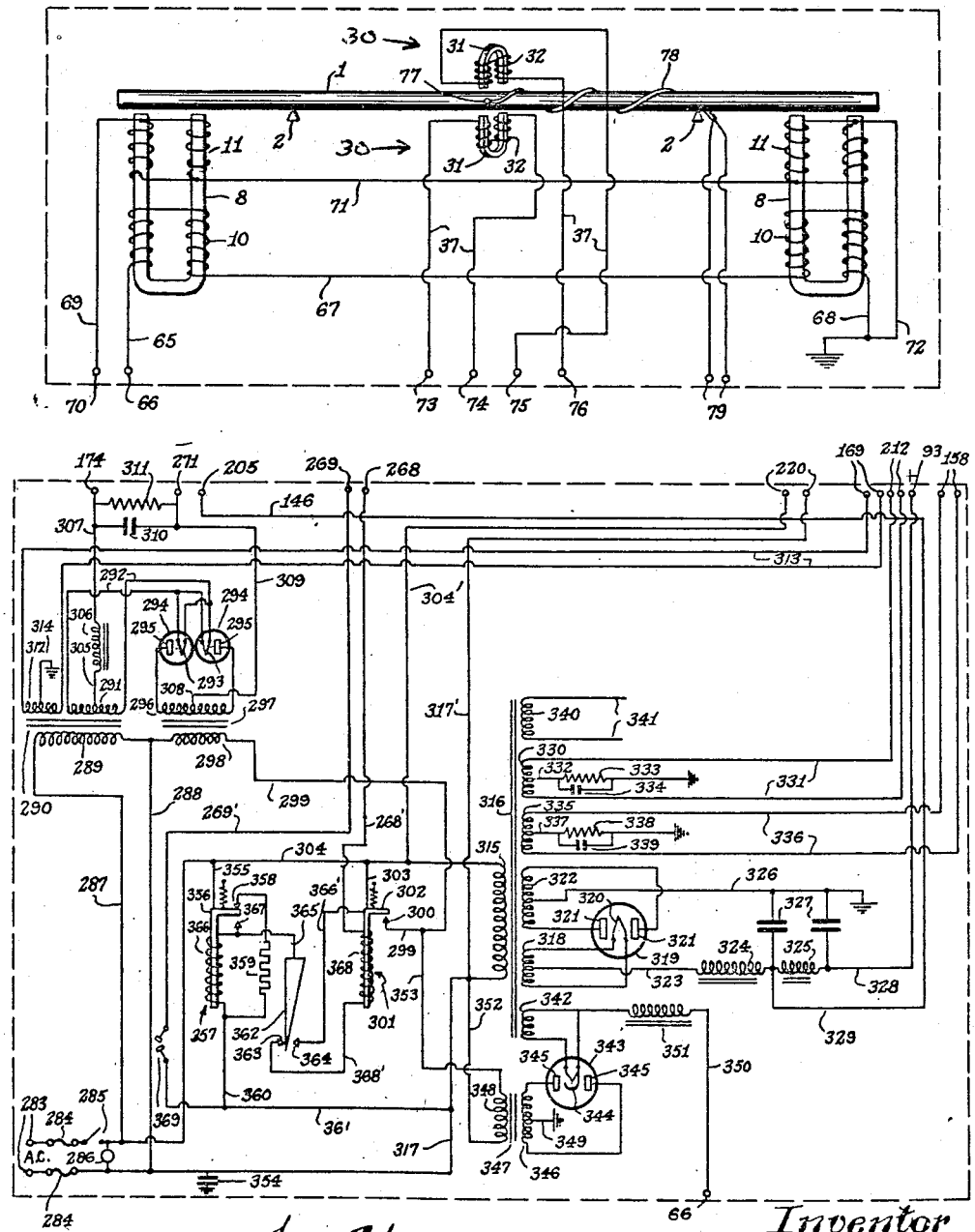
Fig. 20 is a diagrammatic circuit of the vibrator unit.
Fig. 21 is a diagrammatic circuit of the power supply unit.

The complete circuit of my machine is shown in Figs. 19, 20 and 21. As will be seen, conductors extend to various terminals on each of these figures. The terminals on each figure are intended to be directly connected to similar terminals on another figure. In the interest of clarity, therefore, terminals which are to be connected together bear the same reference numeral in each of these three figures.

The various coils of the vibrator unit described above are connected in the circuit diagrammatically shown in Fig. 20. One end of the series-connected direct current coils of the left-hand core 8 is connected by means of the conductor 65 to a terminal 66 which is supplied with a direct current potential from a power supply unit to be described hereinafter. The direct current coils 10 of the right-hand vibrator core 8 are connected in series with the other coils 10 of the left-hand unit by means of a conductor 67. The opposite end of said coils 10 is then connected by means of a conductor 68 to ground. The ground in this case constitutes the other terminal for the source of direct current, and in this way the coils 10 are fed with direct current which magnetizes the cores 8. On each core 8 the two alternating current excitation coils 11 thereof are connected in parallel. These two pairs of parallel connected coils are then connected in series by means of the conductor 71. The left-hand end of this series circuit is connected by means of a conductor 69 to a terminal 70 which is supplied from said power supply unit with an alternating current potential whose frequency is controlled as will be described below. The other end of the circuit for the alternating current excitation coils 11 is connected by means of a conductor 72 to ground. Likewise in this case the ground connection constitutes the other terminal for the source of alternating current. Thus the coils 11 are supplied with an alternating current which varies the magnetization of the cores 8, and thus produces a variable magnetic field external thereto. This variable magnetic field operating on the test piece 1 causes said test piece to vibrate in accordance with the variation of said magnetic field.

The test piece 1 carrying the armature 42 and vibrating between the pickup cores 31 induces voltages in the pickup coils 32. These voltages are conducted by means of the conductors 37 to the terminals 73 to 76, inclusive, from which the connections to the control devices are made, as will be described hereinafter.

One of the significant facts which may be determined upon vibration of a test piece is the increase in temperature which occurs therein. In order to determine this temperature, a thermo-couple 77 may be secured to the test piece 1 at substantially the midpoint thereof, wherein the maximum stresses occur. A pair of leads 78 leading from this thermo-couple may then be looped around the test piece 1 and carried to the node point 2 where it may conveniently leave said test piece. The pair of leads 78 are then led to the terminals 79. These terminals are adapted to be connected to the terminals 79 shown on Fig. 19, from which a pair of leads 80 extend to a meter 81. The meter 81 is responsive to the currents generated in the thermo-couple 77, due to the rise in temperature in the test piece 1, and therefore this meter constitutes a convenient means for registering said increase in temperature. This gives an indication of the damping capacity of the test material.

In the above description, the test piece 1 was described as being of magnetic material. However, this machine is readily adaptable to test other materials. As shown in Fig. 18, if the test piece 1 is of non-magnetic material, such as aluminum, a sleeve 61 of magnetic material, such as iron, may be clamped on each end of the test piece 1. The sleeve 61 would be so located as to lie immediately over the pole faces 9 of the vibrator magnet 7 shown in Fig. 1. In this way the vibrator magnets 7 exert their influence on the magnetic sleeves 61, and in this way transfer the vibrating forces to the test piece 1.

If a flat piece of material is to be tested instead of such a round rod as described above, the form of node cushion shown in Fig. 17 may be used. In this figure the node cushion 62 is shown as being formed of an elongated block of rubber mounted within the node cushion holder 63. The holder 63 may in turn be mounted in the same way as the node cushion 3 upon the upper end of the stud 12, as shown, for example, in Fig. 6. In Fig. 17, the flat test piece 64 may be laid upon the node cushion 62, and in this manner may be readily vibrated by the machine. In connection with a flat and relatively wide test piece, such as shown at 64, the pickup armature construction, as shown in Fig. 10, may be slightly modified in order to take care of such a flat wide test piece. All that need be done is to provide longer clamping bolts 45 so that the clamping member 44 may extend a considerable distance away from the clamping member 43. In this way no matter how wide the flat test piece 64 may be, it will be readily received between the clamping faces 46.

*Oscillator and frequency control*

In order to supply the alternating current excitation coils 11 of the vibrator magnet 7 with alternating current of the proper frequency, an oscillator tube 82 is provided which is connected in a suitable circuit so that oscillations of the proper frequency are generated therein. The tube 82 is preferably a gas-filled tube, such as a thyratron or any other type of gas-filled tube, in which the initiation of the discharge between the cathode and anode is controlled by means of a control electrode. The tube 82, therefore, is provided with a cathode 83, a control electrode 84 and an anode 85. The tube 82 is filled preferably with an ionizable gas, such as, for example, mercury vapor, argon or the like.

In order to supply the tube 82 and various other tubes associated therewith with proper supply voltages, a voltage divider consisting of a series of resistances 86 to 91 is provided. A conductor 92 connects the left end of the voltage divider to ground. This ground connection constitutes the negative terminal of a source of direct current voltage which is supplied from the power supply unit to be described hereinafter. The right-hand end of the voltage divider is connected by a conductor 92' to a terminal 93 which constitutes the positive terminal of said direct current supply voltage. The anode 85 has impressed upon it a positive potential by means of a conductor 94 through a fixed resistance 95, a variable resistance 96, and a conductor 97 which is connected to the voltage divider between the resistances 89 and 90. In order to vary the amount of the resistance 96 which is included in this circuit, said resistance is provided with a control member 98. In order to bypass the oscillations produced by the tube 82 around the voltage divider, a condenser 99 is connected from the conductor 97 to ground. In order to provide a negative potential for the cathode 83, a conductor 100 connects said cathode 83 to the voltage divider between the resistances 86 and 87. A condenser 101 is connected between the cathode 83 and the anode 85.

The above circuit described in connection with the tube 82 constitutes what is known as a relaxation oscillator circuit. In this circuit current flowing through the resistances 95 and 96 gradually builds up the charge on the condenser 101, and therefore the voltage across said condenser gradually increases. When this voltage reaches a predetermined value, the space between the cathode 83 and the anode 85 breaks down and short-circuits said condenser 101, thus discharging it. When the condenser is discharged, the discharge between the cathode 83 and the anode 85 stops, whereupon the process of charging and discharging the condenser 101 is then repeated. This action, therefore, produces at the anode 85 a periodically varying voltage. The frequency of this voltage depends upon the value of the potential applied to the tube, the value of the resistances 95 and 96, and the value of the capacity of the condenser 101. However, such a circuit has the additional property of assuming whatever frequency is impressed upon the control electrode 84. When such a voltage is impressed upon the electrode 84, the time of breakdown of the discharge path between the cathode 83 and the anode 85 is no longer determined primarily by the voltage across the condenser 101 but is determined primarily by the voltage on the control electrode 84. For the purposes of this invention, any oscillating circuit whose frequency is varied with and determined primarily by a control electrode or control member will be termed a circuit having an unstabilized frequency characteristic. For example, a multivibrator oscillator may be used instead of the relaxation oscillator described. Since before any control voltage is impressed upon the control grid 84, the frequency of the oscillator tube 82 depends upon the value of the resistance in the anode circuit, it will be seen that by adjusting the resistance 96 by means of the control member 98, the initial frequency of the oscillator tube 82 may be adjusted to any desired value.

In the present invention the frequency of the oscillator tube 82 is determined and fixed by the frequency at which the test piece 1 vibrates. As previously indicated, the vibration of the test piece 1 generates in the pickup coils 32 an alternating potential whose frequency is equal to the resonance frequency of said test piece 1. This voltage is amplified and impressed upon the control grid 84 as follows. A connecter 102 connects the two terminals 74 and 75, and thus establishes a central tap connection between the upper and lower set of pickup coils 32. A ground connection is established from the terminal 73 by means of a conductor 103. The voltage generated in the lower set of coils 32 is then led by a conductor 104 through a condenser 105 to the control grid 106 of the amplifier tube 107. The condenser 105 is provided in order to prevent the voltage of the voltage divider from being fed back to the pickup coils 32. The amplifier tube is provided with a cathode 108 and an anode 109. The control grid 106, as is well known, will control and amplify the flow of current between the cathode 108 and the anode 109. The cathode 108 is connected through a resistance 110 and a conductor 111 to the voltage divider between the resistances 87 and 88. In this manner a suitable negative voltage is impressed upon the cathode. The resistance 110 is bypassed by the condenser 112 which, as is well known, automatically gives to the grid 106 the proper operating bias. The grid 106 is connected through the resistance 113 to the negative conductor 111. The anode 109 is connected through conductors 114, 115, resistance 116, conductors 117, 118, 119 to the voltage divider between the resistances 90 and 91. In this way a suitable positive potential is impressed upon the anode 109. Thus variations in current through the above circuit introduce variations in the voltage which appears across the resistance 116. The control voltage applied to the grid 106 produces such variations to an amplified degree, and therefore an amplified voltage at the proper frequency will appear at the upper end of the resistance 116. This amplified voltage is led by means of a conductor 120 and a condenser 121 to the control grid 84, whereby, as described above, the frequency of the oscillator tube 82 is fixed at the resonance frequency of the test piece 1. In order to prevent blocking voltages from being built up on the condenser 121, a resistance 122 connects one side of said condenser to ground.

In order that the alternating currents generated by the oscillator 82 be sufficient to energize the alternating current excitation coils 11, it is desirable that the output of the oscillator tube 82 be amplified through several stages of amplification. For this purpose the voltage generated at the anode 85 is connected by means of conductor 123, condenser 124, resistance 125, and conductor 126 to ground. In this way the alternating voltage generated at the anode 85 is impressed across the resistance 125. A control member 127 is provided, whereby any desired portion of said alternating voltage may be taken from the resistance 125 and impressed upon the control grid 128 of a voltage amplifying tube 129. The tube 129 is provided with an anode 129' and a cathode 130. As is well known, the control grid 128 will control and amplify the current flow between the anode 129' and the cathode 130. The cathode 130 is provided with the proper negative voltage by being connected through a resistance 131 to ground. The resistance 131 is shunted by the condenser 132, and in this way the proper negative bias is generated for the grid 128.

The tube 129 is one which preferably also contains a screen grid 133 which is connected by means of a conductor 134 through a resistance 135 and conductor 136 to a suitable potential between the resistance 88 and 89 on the voltage divider. The anode 129' is connected by means of a conductor 137, an output resistance 138 and a conductor 139 to a suitable positive potential between the resistances 90 and 91 on the voltage divider. The above circuit will amplify the voltage generated by the oscillator tube 82, which amplified voltage appears at the anode 129'. The above amplified voltage is further amplified by being impressed through a condenser 140 and conductor 141 to the control grid 142 of the amplifier tube 143. This amplifier tube is provided with a cathode 144 and an anode 145. The cathode 144 is connected by means of the resistance 146, shunted by the condenser 147, to ground, which is the usual grid bias network. The grid 142 is also connected through a resistance 148 to ground. The output of the anode 145 passes through the primary 149 of an output transformer, and then by means of conductors 150 and 119 to the positive potential existing between the resistances 90 and 91 on the voltage divider. In this way the anode 145 is provided with a suitable positive potential, and the output of the tube 143 is fed through its output transformer. In order to by-pass various alternating voltages which would otherwise cause currents to pass through the voltage divider, condenser 150' is connected from the conductor 118 to ground.

The output of the tube 143 is further amplified by a driver stage. For this purpose the opposite ends of the secondary 151 of the output transformer of the tube 143 are connected by leads 153 to the two control grids 154 of two amplifier tubes 155 connected in a class A push-pull amplifying circuit. The center of said secondary 151 is grounded by the ground lead 152. Each of the tubes 155 is provided with a filamentary cathode 156 which is supplied with heating current from a pair of cathode heater leads 157, which in turn are connected to terminals 158. The terminals 158 are in turn connected to a suitable source of heating current from the power supply unit which will be described hereinafter. The tubes 155 are provided with anodes 159 which are connected to the opposite ends of the primary 160 of an output transformer. In order to supply a suitable positive potential to the anodes 159, the primary 160 is provided with a center tap conductor 161 which extends to the positive supply lead 92'.

The output of the driver stage described above is further amplified by means of a power output amplifier stage. For this purpose the opposite ends of the secondary 162 of the output transformer of the driver stage are connected by means of leads 164 to the control grids 165 of two pairs of power output tubes 166. The center of said secondary 162 is grounded by its ground lead 163. The output tubes 166 are connected as class B push-pull amplifiers. Each of the tubes 166 is provided with a filamentary cathode 167 which is supplied with suitable heating current from a pair of cathode heater leads 168 connected in turn to the terminals 169. The terminals 169 are connected to a suitable source of heater current supplied by the power supply unit to be described hereinafter. Each of the tubes 166 is likewise provided with an anode 170. The two anodes of the upper pair of tubes 166 are connected together, and in turn are connected to the upper end of the primary 171 of the power output transformer 172. The two anodes 170 of the lower pair of tubes 166 are likewise connected together, and in turn to the lower end of the primary winding 171. In order to supply the tubes 166 with a source of power, the primary winding 171 is provided with a center tap lead 173 which in turn is connected to the terminal 174. This terminal 174 constitutes the high voltage power supply terminal of the power supply unit to be described hereinafter.

The power output transformer 172 is provided with a secondary winding 175 which is provided in turn with output leads 176. One of these leads is connected to the terminal 70 and the other is connected directly to ground. As described in connection with Fig. 20, terminal 70 is connected to one end of the alternating current excitation coils 11, the other end of which is connected to ground, and therefore to the other of the power leads 176. In this way the output of the transformer 172 is fed directly to the alternating current excitation coils 11.

In order to provide for proper operation, it is desirable that the circuit of the coils 11 be tuned to the frequency of the current supplied thereto. For this purpose a series of tuning condensers 177 are connected between the two leads 176. Each condenser 177 is provided with a switch 178, whereby it may be connected at will across said pair of leads 176. By a suitable combination of condensers 177 connected in the circuit, the coils 11 may be tuned to any frequency of current which may be supplied thereto.

The operation of the circuits described above is briefly as follows. A test piece 1 is placed in the machine and the control member 98 varied until approximately the resonance frequency of the test piece 1 is reached. At this point the test piece 1 will start to vibrate. This in turn will generate a voltage corresponding to the frequency at which said vibration occurs in the pickup coils 32. When this happens this voltage, as described above, automatically fixes the frequency of the oscillator 82, and in this way the frequency of the current supplied to the coils 11 is automatically locked to the natural frequency of the test piece 1. Thereafter any variation in the natural frequency of vibration of the test piece 1 will produce a corresponding change in the frequency of the current supplied to the coils 11, and in this way the variation in the magnetic field of the magnets 7 will always be in synchronism with the natural frequency of the test piece 1.

*Amplitude indication and control*

In order to provide means for indicating the amplitude of vibration of the test piece 1, the primary 179 of a transformer is connected by means of conductors 103 and 180 to the two terminals 73 and 76, respectively. By this connection the voltage generated by the coils 32 all connected in series is impressed upon said primary winding. The transformer is provided with a secondary winding 181 which is connected through a reactor 182 to a rectifying type microammeter 183. The reactor 182 is sufficiently large so that it constitutes substantially all of the impedance of the circuit network described immediately above. Furthermore, it is so devised that it is always operated upon a straight line portion of the magnetization curve of the iron therein. Under these conditions the impedance of the reactor 182 will vary directly with the frequency of the current which passes through it. For any value of amplitude of vibration of the test piece 1, the voltage generated in the coils 32 will be directly proportional to the frequency of said vibration. Since in the circuit network the voltage generated by the coils 32 is equal and opposite to the voltage drop set up in the reactor 182, the result is that the current which flows through the reactor 182 and consequently through the meter 183 is proportional to the amplitude of vibration of the test piece 1, but is independent of the frequency of said vibration. For example, at a certain amplitude and frequency of vibration of the test piece 1, a certain voltage will be generated in the coils 32 which will cause a definite amount of current to flow through the reactor 182. If the frequency is doubled, the voltage generated in the coils 32 will be double, but likewise the impedance of the reactor 182 will be double. Thus the same value of current flowing through the reactor 182 will produce double the voltage drop which is necessary to be equal and opposite to the voltage generated in the coils 32. Thus, although the frequency of the test piece 1 is double, the current remains the same inasmuch as the amplitude of vibration has not changed. Thus the reading of the meter 183 gives a direct and accurate indication of the amplitude of vibration of the test piece 1, irrespective of the frequency at which said test piece is vibrated.

As either of the pickup units 30 is brought closer to its associated vibrating armature 42 mounted on the test piece 1, the voltage generated in that pickup unit will increase. However, since the two pickup units are both carried by the same block 53, any motion of one of the pickup units toward its vibrating armature 42 will be accompanied by a corresponding movement of the other pickup unit 30 away from its corresponding vibrating armature 42. I have found that through a limited range substantially centrally located between the pickup units 30, the increase of voltage generated in one pickup unit will be compensated for by a corresponding decrease in the voltage generated in the other pickup unit, and thus the resultant voltage generated will be constant. At either side of said central range the resultant voltage increases. It is desirable to have the vibrating armatures 42 centered between the two pickup units 30 in order to assign a fixed calibration for the amplitude meter 183, and for this reason the simultaneous vertical adjustment of the two pickup units 30 by means of the adjusting head 50 is provided. While the test piece is vibrating, the adjusting head 50 is regulated until the amplitude meter 183 reads a minimum. Under these conditions the test piece will be substantially centered between the pickup units 30 and the meter 183 will give an accurate and calibrated indication of the amplitude of said vibration. The various detents 57' on the adjusting rod 57 are provided to permit various amplitudes of vibration of the test piece 1. Since with different spacings between the pickup units 30 the relationship between the reading of the meter 183 and the actual amplitude of vibration is different, the machine is provided with a chart which gives the actual relationship between the reading of the meter 183 and the amplitude of vibration of the test piece 1 for each of the detents 57'.

The amplitude of vibration of the test piece 1 may be adjusted and maintained at said adjustment by means of the following mechanisms. The amplifier tube 107 is provided with a pair of auxiliary anodes 184 cooperating with the cathode 108. The anodes 184 are connected together, and are in turn connected by means of a conductor 185, a resistor 186, and a conductor 187 to the ground conductor 92. The potential appearing at the anode 109 is impressed on the anodes 184 through the conductor 114 and the condenser 188. As previously indicated, the voltage at the anode 109 is an alternating voltage which at each frequency of vibration of the test piece 1 is proportional in magnitude to the amplitude of said vibration. The combination of the cathode 108 and the anodes 184 acts as a rectifier to rectify this alternating potential applied to the anodes 184. Therefore, a direct current proportional in magnitude to the amplitude of vibration will flow through the resistance 186, and the voltage drop across said resistance will likewise be proportional to said amplitude. A control member 189 is provided, whereby any desired portion of the voltage drop across the resistance 186 may be taken therefrom. The control member 189 is connected through the resistances 190 and conductor 192, to an additional control grid 193 of the voltage amplifying tube 129. The condensers 191 are connected from the resistances 190 to the conductor 187. The resistances 190 and the condensers 191 act as a filter network to smooth out the pulsating voltage drop which occurs through the resistance 186 as a result of the passage therefrom of the rectified pulsations of current from the anodes 184. A smooth direct current voltage therefore appears at the additional control electrode 193, which voltage is proportional to the amplitude of vibration of the test piece 1. The additional control electrode 193 has the property of varying the mutual conductance, and therefore the degree of amplification of the tube 129 inversely in accordance with the magnitude of the voltage impressed on said grid 193. Thus, if while the test piece 1 is vibrating at a certain amplitude, said amplitude tends to increase, the voltage at the anode 109 will tend to increase, and likewise the voltage across the resistance 186 will tend to increase. This increase in voltage is then impressed on the additional control grid 193 which reduces the amplification of the tube 129, thus reducing the input to the amplifier tubes 143, 155 and 166, so that the power input to the coils 11 will decrease. This decrease in power input to the coils 11 tends to decrease the implitude of vibration of the test piece 1. Any tendency for the vibration of the test piece 1 to decrease in amplitude will operate on the system as described in order to produce an increase in the amplification of the tube 129, and therefore an increase in the power fed to the coils 11, thus tending to increase the amplitude of vibration of the test piece 1. Therefore, the system which I have described is one which keeps the amplitude of vibration of the test piece 1 constant to a very marked degree.

The control members 189 and 127 permit any desired amplitude of vibration to be selected which when so selected by said control members remains fixed by the operation of the circuit as described above. In order to accomplish said adjustment, the control 189 is first set at its lowermost value so that none of the voltage across the resistance 186 is impressed on the additional control grid 193. Under these conditions the automatic amplitude control is not in operation. The control 127 is then varied, whereby the degree of amplification of the tube 129 is varied. In this way the power input to the coils 11 is varied until an amplitude of vibration, as indicated on the meter 183, somewhat in excess of that desired is produced. The control member 189 is then adjusted so as to introduce some of the voltage across the resistance 186 which decreases the amplification of the tube 129, and thus reduces the power input to the coils 11 and the amplitude of vibration of the test piece 1 to the desired value. The introduction of the voltage across the resistance 186 introduces the automatic amplitude control whereupon the amplitude is maintained at the fixed value selected by the operation of this circuit as described in the foregoing paragraph.

*Frequency determination and cycle counter*

It is desirable that the frequency at which the vibration of the test piece occurs and the total number of vibrations to which the test piece is subjected before fracture be determinable on the machine. In order to accomplish this, the following mechanisms are provided. The alternating voltage of the oscillator tube 82 is conducted by means of the lead 194 through the condenser 195 to a grid 196 of an amplifier tube 197. A ground connection for the grid 196 is provided through the resistance 197'. The tube 197 is provided with a cathode 198 and an anode 199. The output current from the anode 199 is led through a conductor 200, the primary 201 of the coupling transformer 202, resistance 203, and conductor 204 to a terminal 205. To the terminal 205 is connected a positive potential from the power supply unit to be described hereinafter. In this way the anode 199 is provided with a source of power, and the output of said anode is fed into the coupling transformer 202. The connection of the cathode 198 to the ground or negative terminal of the power supply source will be described hereinafter.

The opposite ends of the secondary winding 206 of the coupling transformer 202 are connected to the grids 208 of the two amplifier tubes 209 which are connected in a push-pull amplifying circuit. The secondary 206 is likewise provided with a center tap connection 207 to ground. The tubes 209 are each provided with a filamentary cathode 210 which is supplied with heater current from a pair of cathode heater leads 211 connected to the terminals 212. To the terminals 212 is connected a source of heater current from the power supply unit. Each tube 209 is likewise provided with an anode 213. The two anodes 213 are connected to the opposite ends of the primary winding 214 of an output transformer. The primary winding 214 is likewise provided with a center tap lead 215 which extends to the lead 204, and thence to the terminal 205 which, as indicated above, constitutes the positive terminal of a supply of voltage from the power supply unit. The secondary 216 of the output transformer is connected across the cycle counter motor 217. This cycle counter motor is a synchronous motor which is thus driven by the current supplied to it from the secondary winding 216. Since the current supplied by the secondary winding 216 represents an amplification of the current generated by the oscillator tube 82, it will be seen that the frequency of the current supplied to the cycle counter motor 217 is the same as the frequency of the oscillator tube 82, and therefore is the same as the frequency of vibration of the test piece 1. The cycle counter motor 217 drives the count unit which will be described hereinafter.

The cycle counter motor 217 and its associated cycle counter may be utilized to measure frequency of vibration of any given test piece 1. In order to do this, mechanisms are provided whereby the cycle counter motor 217 counts the number of vibrations of the test piece 1 during a definite predetermined interval. The quotient, therefore, of the number of cycles counted divided by the time interval chosen gives an accurate measurement of the frequency of vibration. A standard timer 218 is provided which is constructed so that when set in operation it continues in its operation for a predetermined length of time, at the end of which it closes a connection which will be described below. The timer 218 is so constructed that any given predetermined period of time may be chosen. The timer 218 is supplied with power over two leads 219 which are connected to the terminals 220 which constitute the terminals of a standard alternating current line coming from the power supply unit. A conductor 221 is connected to one side of a starting switch 222, the other side of which is connected by the conductor 233 to one of the supply lines 219. When the timer 218 has been set to run for a certain predetermined interval and the switch 222 is closed, the operation of the timer 218 is started. After the timer has operated for the time selected, a connection is made whereby the conductor 223 is connected to the right-hand power supply lead 219. The conductor 223 is in turn connected to one end of the actuating coil 224 of the cycle counter relay 225. The other end of the actuating coil 224 is connected by means of conductors 226 and 227 to the other power supply lead 219. Therefore, when the timer 218 operates at the end of the predetermined interval to energize the conductor 223, the cycle counter relay 225 will be actuated. This in turn actuates the brake 228 so that at the end of the time selected for the timer 218, the cycle counter motor 217 is stopped within less than one cycle by the brake 228. At the same time, as the brake 228 is applied, the power supply to the cycle counter motor 217 is cut off. For this purpose the cycle counter relay 225 is provided with a movable contact 229 which is connected to ground. Adapted to cooperate with said contact 229 is the stationary contact 230 which is connected through the conductor 231 and the condenser 232 to the upper end of the primary winding 201 of the coupling transformer 202. The lower end of said primary winding 201 is likewise connected to ground through the condenser 232'. Thus when the relay 225 is operated and the contacts 229 and 230 are closed, the alternating current voltage which appears across the primary winding 201 is short-circuited through the condensers 232 and 232', and therefore no power is transmitted through the coupling transformer 202. In this way the amplifier tubes 209 are deenergized, and no power is fed to the cycle counter motor 217. From the foregoing it will be seen that when the starting switch 222 is closed, the cycle counter motor 217 will run for a predetermined interval as determined by the setting of the timer 218, and will count the total number of cycles or of vibrations of the test piece 1 which occurred during that time interval. The timer 218 may be set at intervals of from one second to five minutes. The accuracy of the frequency measurement, therefore, is dependent only upon the time interval over which the number of cycles is counted. If a higher degree of accuracy is desired, a longer time interval is selected.

When the switch 222 is opened, the connection between the conductor 223 and the right-hand lead 219 is broken, and the automatic timer 218 is re-conditioned for the next timing operation. The breaking of the circuit between the leads 223 and 219 causes the excitation coil 224 to be deenergized, thus opening the contacts 229 and 230, and removing the brake 228.

At the higher frequencies at which the machine is adapted to operate, the cycle counter motor 217 is not always self-starting. To correct this, one side of the cycle counter motor is connected by a conductor 235 to one side of a switch 234, the other side of this switch being connected to the conductor 233. As will be seen, this conductor 233 is connected to the right-hand power supply lead 219. The other side of the cycle counter motor 217 is connected by means of conductors 236, 237 and 227 to the other power supply lead 219. Thus, upon closing the switch 234, the voltage of the power supply lines 219 is impressed directly across the cycle counter motor 217 which is thus given an initial spin which enables it to start even though the higher frequencies are fed to it from the secondary winding 216.

When the test piece 1 is subjected to a fatigue test, the cycle counter motor 217 is permitted to run throughout said test, and thus count the total number of vibrations to which the test piece is subjected. For this purpose the ground connection to the cathode 198 of the amplifier tube 197 is made through the resistance 238, the conductor 240, a stationary contact 241 of the relay 242, the movable contact 243 of said relay, the conductor 244, and the starting switch 245 to ground. The resistance 238 is bypassed by the condenser 239 to supply the usual grid bias to the grid 196. The contacts 241 and 243 and the starting switch 245 are normally in their closed position, and thus the tube 197 is normally energized. The relay 242 is adapted to be opened at the end of a test run, as will be described hereinafter. When the relay 242 is thus opened, the contacts 241 and 243 are separated, opening the ground connection of the cathode 198 and thus deenergizing the tube 197. In this way the power is cut off from the cycle counter motor 217, and therefore this motor will stop. Although the brake 228 is not applied at this time, the few additional cycles for which the cycle counter motor 217 coasts will not introduce any appreciable error into the test results because such a test will consist of many thousands of vibrations of which the additional cycles introduced by the coasting of the motor form a negligible part.

*Automatic shut-off upon fracture of test piece*

In the usual fatigue test which is run upon a test piece with the present machine, it is desirable that when a fracture develops in the test piece, the machine be stopped automatically. For this purpose the machine is provided with a tuned reed 246 incorporated in a tuned reed relay assembly which will be described hereinafter. The reed 246 is adapted to be set in vibration by a driving coil 247. One end of this coil is connected through the current-limiting resistance 248 and conductor 236 to one side of the secondary winding 216. The other side of the coil 247 is connected by means of the conductor 249 to the other side of the secondary coil 216. In this way the coil 247 is supplied with an alternating driving current of the frequency of the vibrating test piece 1. When the reed 246 is thus adjusted so as to have the same frequency as that of the vibrating test piece 1, it will be set in vibration by the driving coil 247.

The tuned reed 246 is connected to ground by means of a conductor 250. The reed 246 is adapted to cooperate with a stationary contact 251 which leads to a switch 252. The switch 252 is adapted to be connected to either of two contacts 253 or 258. The contact 253 is the tuning contact while the contact 258 is the normal or running contact. The contact 253 is connected to a lamp 255 which is preferably a neon glow lamp. The other side of said lamp is connected through a condenser 256 and a conductor 257 to the left-hand lead 219. As will be described in connection with the power supply unit, the right-hand line 219 is also connected to ground through a condenser. When the reed 246 is set in vibration, a connection will be made from the stationary contact 251 to ground, and in this way the voltage from the power supply lines 219 will be impressed upon the lamp 255 through the two condensers described above. In this way the lamp 255 will be lit when the frequency of the current supplied to the driving coil 247 reaches the resonance frequency of the reed 246.

In starting the vibration test, the switch 252 is placed in the tuning position so that connection is made to the contact 253. The reed 246 is then turned by its controlling member, which will be described below, until the lamp 255 is illuminated. Since upon the development of a fracture in the test piece 1, the natural frequency thereof will drop, the reed 246 is then slightly detuned to a lower frequency, preferably about five cycles below that of the initial resonance frequency. When this is done, the lamp 255 is extinguished.

After the above adjustment has been made, the switch 252 is moved to the running or normal position in which a connection is made to the contact 258. The contact 258 is connected through the conductors 259 and 260 to the upper end of the actuating coil 261 of the relay 242. The other end of the actuating coil 261 is connected by means of a conductor 262 to the voltage divider between the resistances 87 and 88. After the test piece 1 has been vibrated to such an extent that a fracture develops in it, its frequency will drop, and when its frequency drops to that of the tuned reed 246, a connection will be made from the stationary contact 251 to ground. Since the voltage divider is connected by the conductor 92 to ground, the voltage appearing in the voltage divider across the resistances 86 and 87 will be impressed upon the actuating coil 261 which thus will actuate the relay 242. To keep the vibrator currents from the relay 242, a bypass condenser 263 is connected from the lead 262 to ground. When the relay 242 is actuated upon the development of a fracture in the test piece 1, the movable contact 243 engages the stationary hold-in contact 278. This stationary contact is connected by means of the conductors 279, 259 and 260 to the upper end of the actuating coil 261. The other end of said operating coil, as pointed out above, is connected to a source of voltage on the voltage divider. Thus when contacts 243 and 278 are brought into engagement, the operating circuit for the coil 261 is completed through the conductor 244, and the starting switch 245 to ground. Thus even a momentary actuation of the tuned reed 246, as the frequency of the test piece 1 passes through resonance with the reed 246, will cause the relay 242 to be actuated and to remain in its actuated position. In order to assist the operation of the relay 242 when actuated by the reed 246 and to prevent its chattering, a condenser 270 is provided from the conductor 259 to ground.

The relay 242 is also provided with a movable contact 264 adapted to cooperate with a stationary contact 265. These two contacts are connected by means of the conductors 266 and 267 to the terminals 268 and 269, respectively. As will be described hereinafter in connection with the power supply unit, the opening of the circuit between the terminals 268 and 269 by separation of the contacts 264 and 265 will deenergize that portion of the power supply unit which furnishes power to the direct current polarization coils 10 and to the anodes of the tubes 166. Thus upon operation of the relay 242, both sets of coils on the vibrator unit will be deenergized, and thus all driving forces upon the test piece 1 will be removed. As previously pointed out, the separation of the contacts 241 and 243 on the relay 242 also deenergizes the cycle counter motor 217, and thus its operation ceases at the same time.

Any other change in the operating characteristics of the test piece as it approaches the fracturing point could be used to terminate the operation of the machine. For example, as the fracturing point approaches, the sound emitted by the vibrating test piece changes, which change could be used as the control factor to stop the operation.

*Overload protection and manual control of starting and stopping*

In order to protect the machine against overloads, an overload relay 274 is provided. The terminal 271 constitutes the terminal on the power supply unit from which the ground connection for the plate supply of the power output tubes 166 is to be made. This ground connection is made through a conductor 272, operating coil 273 of the overload relay 274, the conductor 275, the plate current meter 276, and the conductor 277 to ground. From this connection it will be seen that the meter 276 will give an indication of the amount of current flowing in the plate circuit of the power output tubes 166. This indication likewise will be a measurement of the power being fed to the alternating current excitation coils 11, and therefore the amount of power being fed into the vibrating test piece 1. In order to assist in the operation of the overload relay 274, a bypass condenser 273' is connected around the operating coil 273. The overload relay 274 is provided with a movable contact 280 adapted to cooperate with a stationary contact 281. This stationary contact is connected through the conductor 275, the plate current meter 276, and the conductor 277 to ground. The movable contact 280 is connected by means of the conductor 259 to the upper end of the operating coil 261 of the relay 242. When an overload occurs, due to excess power being fed to the test piece 1, the overload relay 274 will be operated to connect the two contacts 280 and 281. This will complete a circuit to ground from the upper end of the operating coil 261 of the relay 242. In this way the power supply circuit for the operating coil 261 is completed and the relay 242 will be operated. As pointed out above, the actuation of the relay 242 stops the operation of the machine, and due to the hold-in contact 278, this stoppage becomes permanent until the machine is re-started by the operator.

If at any time the operator wishes to stop the machine, he actuates the stop push button 282 which thereupon connects the conductor 259 to ground. In this way the upper end of the operating coil 261 of the relay 242 is connected to ground which causes the relay 242 to be operated. As previously indicated, this stops the operation of the machine.

When the relay 242 has been actuated, due to the operation of the tuned reed 246, the overload relay 274 or the stop push button 282, the machine may be re-started by actuation of the start push button 245. When the start push button 245 is actuated, the connection from the conductor 244 to ground is opened. Since the completion of the hold-in circuit for the coil 261 depends upon the maintenance of this ground connection, the breaking of said connection opens the holding circuit for the coil 261, whereupon the relay 242 is deenergized and the contacts 264 and 265 and the contacts 241 and 243 are reclosed, whereupon the machine is again set in operation.

*Power supply unit*

The various circuits as described above are all energized from the power supply unit illustrated in Fig. 21. This power supply unit is furnished with a standard supply of alternating current from two terminals 283 which are adapted to be connected to an alternating current power line.

A fuse 284 is connected to each of the terminals 283. In one of the lines leading from the terminals 283 is connected the main switch 285. Across the two power lines on the opposite side of the main switch 285 from the terminals 283 is connected a pilot lamp 286 which thus indicates when the switch 285 is closed and the machine is being supplied with power.

In order to supply the power output tubes 166 described above with a source of power, the two high-voltage rectifying tubes 294 are provided. These tubes are each provided with a filamentary cathode 293. In order to supply these cathodes with heating current, a heating transformer 290 has its primary winding 289 connected to the power terminals 283 through the conductors 287 and 288. The secondary winding 291 of the transformer 290 has its two outer ends connected by means of the conductors 292 to the two filamentary cathodes 293 connected in parallel. Thus when the switch 285 is closed, the transformer 290 will be energized and the filamentary cathodes 293 will be supplied with heating current.

The tubes 294 are likewise each provided with an anode 295. The two anodes 295 are connected to the outer ends of secondary winding 296 of a power transformer 297. The transformer 297 is energized by a primary winding 298. One end of the primary winding 298 is connected by the conductor 288 to one of the power lines; the other end of the primary winding 298 is connected by means of the conductor 299 to the stationary contact 300 of the main plate voltage supply relay 301. The relay 301 is provided with a movable contact 302 which is adapted to engage the stationary contact 300. When the relay 301 is deenergized, the contacts 302 and 300 are separated. Conductors 303 and 304 connect the movable contact 302 back to the other side of the power supply line. Thus when the relay 301 is energized and the contacts 300 and 302 are closed, the transformer 297 is energized and the rectifier tubes 294 are supplied with power.

The secondary 291 of the heating transformer 290 is provided with a center tap connection 305 which leads through the filter choke 306 and is connected by means of the conductor 307 to the terminal 174, which as described above constitutes the positive terminal for the power supply of the power output tubes 166. The secondary winding 296 of the power transformer 297 is provided with a center tap connection 308 which is connected by means of the conductor 309 to the terminal 271. As described above, the terminal 271 constitutes the ground or negative terminal of the power supply for the tubes 166. A filter condenser 310 is connected across the leads 307 and 309. A bleeder resistance 311 is also connected across said conductors.

In order to supply the filaments 167 of the tubes 166 with heating current, the transformer 290 is provided with a secondary winding 312. The opposite ends of this secondary are connected by a pair of conductors 313 to the terminals 169. As pointed out above, the terminals 169 are connected to the filaments 167 of the tubes 166. The secondary winding 312 is connected by means of a center tap 314 to ground.

All of the tubes described in connection with Fig. 19, with the exception of the tubes 166, are supplied with power from the transformer 316, as shown in Fig. 21. This transformer is provided with a primary winding 315. One end of the primary winding is connected by means of the conductor 304 to one side of the alternating current supply line, and the other end of said primary winding 315 is connected by means of conductor 317 to the other side of the alternating current supply line.

The rectifier tube 319 supplies plate voltages for all of the tubes described in Fig. 19, with the exception of the tubes 166. The filament 320 of the rectifier tube 319 is supplied with heating current from a secondary winding 318 on the transformer 316. The tube 319 is also provided with two anodes 321 which are connected to the opposite ends of the secondary winding 322 also provided on the transformer 316. A conductor 323 connects the center point of the secondary 318 through the filter chokes 324 and 325 to the conductor 328, which in turn is connected to the terminal 93. A conductor 326 connects the center point of the secondary winding 322 to ground. Two filter condensers 327 are connected between the conductors 326 and 328 on opposite sides of the filter choke 325. As pointed out above, the terminal 93 is connected to the positive supply voltage lead which supplied positive voltage to the various tubes described in connection therewith in Fig. 19. The conductor 326 (Fig. 21) being connected to ground constitutes the negative side of said voltage supply. A conductor 329 extends from between the filter chokes 324 and 325 to the terminal 205. This terminal (Fig. 19) is connected to the conductor 204 which, as pointed out above, constitutes the positive voltage supply conductor for the tubes 197 and 209.

The filaments 210 of the tubes 209 are supplied with heater current from the secondary winding 330 (Fig. 21) on the transformer 316. The opposite ends of this secondary winding are connected by a pair of conductors 331 to the terminals 212. The center point of the secondary winding 330 is connected by means of a conductor 332 through a resistance 333 to ground. The resistance 333 is bypassed by the condenser 334. The resistance 333 and the condenser 334 provide the usual bias for the tubes 209. As pointed out above, the terminals 212 are connected to the filaments 210 of the tubes 209 (Fig. 19). The filaments 156 of the tubes 155 are provided with heating current from the secondary winding 335 (Fig. 21) on the transformer 316. The opposite ends of this secondary winding 335 are connected by a pair of conductors 336 to the terminals 158. As pointed out above, these terminals 158 are connected to the filaments 156 (Fig. 19) of the tubes 155. The center point of the secondary winding 335 (Fig. 21) is connected by means of a conductor 337 through the resistance 338 to ground. The resistance 338 is likewise bypassed by the condenser 339 to supply the usual grid bias for the tubes 155.

Each of the tubes (Fig. 19) 107, 82, 129, 143 and 197 are provided with an indirectly-heated type of cathode which is heated to its operating temperature by means of a heating filament not shown. These heating filaments are each provided with heating current from the secondary winding 340 (Fig. 21) on the transformer 316. The secondary winding 340 is provided with a pair of leads 341 which in turn are connected to each of the heating filaments of the tubes mentioned above.

The D. C. polarizing coils 10 (Fig. 20) are supplied with direct current from the rectifier tube 343 (Fig. 21). The tube 343 is provided with a cathode 344 which is supplied with heating current from the secondary winding 342 wound on the transformer 316. The tube 343 is also provided with two anodes 345 which are connected to the opposite ends of the secondary winding 346 of the transformer 347. The primary winding 348 of the transformer 347 has one end thereof connected by means of the conductors 352 and 317 to one side of the alternating current line. The other end of said primary winding 348 is connected by means of the conductors 353 and 299 to the stationary contact 300 of the relay 301. As previously indicated, the movable contact 302 is connected by means of the conductors 303 and 304 to the other side of the alternating current supply line. Thus the voltage supply to the anodes of the tube 343 is controlled by means of the relay 301. The center point of the secondary winding 346 is connected by means of the conductor 349 to ground, and thus constitutes the negative terminal of the power supplied by the tube 343. The cathode 344 is connected through a choke 351 and conductor 350 to the terminal 66, which as previously indicated constitutes the positive supply terminal for the direct current polarizing coils, the opposite end of which is connected by the conductor 68 to ground and thus back to the center point of the secondary winding 346 through its ground connection 349. The choke 351 has a very high impedance to alternating current, and thus prevents the alternating voltage generated in the direct current polarizing coils by the alternating current excitation coils 11 from causing any appreciable amount of alternating current to flow through the direct current polarization coils 10.

The upper alternating current supply terminal 283 is connected through the fuse 284, the main switch 285, the conductors 304 and 304' to one of the terminals 220. The lower alternating current supply terminal is connected through the fuse 284 and the conductors 317 and 317' to the other terminal 220. Thus the terminals 220 constitute a supply of alternating current connected directly to the main alternating current supply terminals 283. As pointed out above (Fig. 19), the terminals 220 supply alternating current to the timer 218, the cycle counter motor 217, and the resonance-indicating lamp 255. The lower alternating current supply terminal (Fig. 21) is connected to ground through the condenser 354 in order to complete the circuit for the resonance-indicating lamp 255 as mentioned above in connection with the description of said lamp.

In the case of the tubes 343 and 294, it is desirable to have the cathodes raised to their operating temperature before the anode voltage is supplied thereto. For this purpose the closing of the relay 301 is delayed by means of the time delay relay 357. This relay is provided with a movable contact 356 connected by lead 355 to the lead 304, and thus to one side of the alternating current supply line. The movable contact 356 is in its upper position in engagement with the stationary contact 358 when the relay 357 is deenergized. The stationary contact 358 is connected through a heating resistance 359, and by means of the conductors 360, 361 and 317 back to the other side of the alternating current line. Thus when the main switch 285 is initially closed, the heating resistance 359 is supplied with heating current. This heating resistance is associated with the thermostatic strip 362. Thermostatic strip 362 in its cold position is adapted to contact with the stationary contact 363, and when heated by the resistance 359 moves into engagement with the stationary contact 364. The thermostatic strip is permanently connected by means of a conductor 365 to the upper end of the operating coil 366 of the time delay relay 357. The hot position contact 364 is connected by means of a conductor 366' to the movable contact 302 on the relay 301.

From the foregoing it will be seen that after the main switch 285 has been closed for a sufficiently long time to permit the resistance 359 to cause the thermostat 362 to move into engagement with the contact 364, the operating coil 366 of the time delay relay 357 is energized. This energization is accomplished through the following circuit: lower terminal 283, fuse 284, conductors 317, 361 and 360, coil 366, conductor 365, thermostat strip 362, contact 364, conductor 366', movable contact 302, conductors 303 and 304, main switch 285, fuse 284 to upper terminal 283. As soon as the above circuit is completed and the relay 357 is energized, the contacts 356 and 358 are opened, whereby the heating current is disconnected from the resistance 359, permitting the thermostatic strip 362 to cool down and gradually move back into engagement with the stationary contact 363. In order to maintain the circuit for the operating coil 366, the upper end thereof is connected to the stationary contact 367 which engages the movable contact 356 upon the energization of the relay 357. Thus instead of the upper end of the operating coil being connected to the upper terminal 283 through the circuit traced above, it is now connected to said terminal through the conductors 355 and 304. Thus once the relay 357 has been operated after an initial closing of the switch 285, it will remain in its energized or operating condition. After the thermostatic strip 362 has again moved to the cold position and engaged stationary contact 363, an energizing circuit for the operating coil 368 of the relay 301 is completed. This circuit is as follows: upper terminal 283, fuse 284, main switch 285, conductors 304, 355, movable contact 356 of relay 357, stationary contact 367, conductor 365, thermostatic strip 362, stationary contact 363, conductor 363', operating coil 368, conductor 268', terminal 268, conductor 266 (Fig. 19), movable contact 264 of relay 242, stationary contact 265, conductor 267, terminal 269, conductor 269' (Fig. 21), door switch 369, conductors 361 and 317, fuse 284 to the lower terminal 283. From the foregoing it will be seen that the energization of the operating coil 368 of the relay 301 is also controlled by the relay 242 of Fig. 19. Once the foregoing energization circuit for the operating coil 368 is completed, the movable contact 302 will be brought into engagement with the stationary contact 300, thus completing the energization for the primary windings 298 and 348 for the transformers 297 and 347, respectively. The operation described above consists in heating up and cooling down of the thermostatic strip 362 before the relay 301 is closed. Throughout this interval the filament circuits for all of the tubes are energized, and therefore sufficient time elapses for all of the cathodes to be heated to their operating temperature before the transformers 297 and 347 are energized. Since these two transformers and their associated tubes 294 and 343, respectively, supply the energy for both the alternating current and direct current coils on the vibrator unit, said vibrator unit is deenergized until the various tubes have reached their proper operating condition.

Since the energization of the transformers 297 and 347 is likewise controlled by the contacts 264 and 265 (Fig. 19) of the relay 242, due to the control which these contacts exercise upon the energizing coil 368 (Fig. 21) of the relay 301, it will be seen that whenever the relay 242 is operated, the direct current and alternating current coils 10 and 11, respectively, of the vibrator unit are deenergized. As described above, such deenergization occurs whenever stoppage of the operation of the machine is desired.

The door switch 369 referred to above is connected to a door on a cabinet rack which contains the various elements described in connection with Figs. 19 and 21, so that when the door is open, the voltage supplied from the tubes 294 and 343 is cut off, thus permitting safe access by the operator to the interior of said cabinet rack.

Cabinet rack assembly

The reference numeral 370 in Fig. 11 represents the cabinet rack referred to above. This rack is mounted upon casters 371 so that it may readily be moved from place to place. On the front of the cabinet rack 370 is mounted a number of panels behind which are mounted the various devices described in connection with Figs. 19 and 21 and upon which are likewise mounted the various control and indicating devices. The uppermost panel 372 constitutes the meter panel upon which are mounted the plate current meter 276, the amplitude-indicating meter 183, and the temperature-indicating meter 81. Immediately below the meter panel 372 is mounted the oscillator panel 373 behind which are mounted various elements constituting the oscillating circuit of the machine. Upon this oscillator panel are mounted the three controls 189, 98 and 127. As described above, the controls 189 and 127 regulate the amplitude of vibration of the test piece 1 while the control 98 adjusts the frequency of the oscillator. Below the oscillator panel 373 is mounted the cycle counter panel 374. Behind this panel are mounted the various elements of the cycle counter circuit. Upon the upper part of the cycle counter panel is provided an opening through which the indicating dials 375 of the cycle counter itself may be observed. Below this is mounted a knob 376 whereby the cycle counter may be reset to zero. Also mounted on the cycle counter panel 374 is the tuning control member 378, whereby the frequency of the tuned reed may be adjusted by a mechanism to be described below. Adjacent the tuning member 378 is the resonance indicator lamp 255 described above. The push-button switch 234, which initiates the starting of the cycle counter motor 217 at higher frequencies, is also mounted on the panel 374. Adjacent the starting switch 234 is mounted the control member 379, whereby the automatic timer may be set to run for any predetermined time, as described above. Also mounted on the cycle counter panel 374 are the switches 252 and 222 which are associated with the cycle counter as described above.

Below the cycle counter panel 374 is mounted the switch panel 380. Upon this panel are mounted the starting switch 245, the main switch 285, and the stop push button 282. Adjacent the main switch 285 is mounted the pilot lamp 286 which indicates whether or not the power is connected to the machine. On the lower part of the switch panel 380 are mounted the switches 178, whereby the alternating current excitation coils 10 of the vibrator unit may be tuned to resonance with the alternating current supplied thereto.

Below the switch panel 380 is mounted the power supply panels 381.

The tuned reed 246 and its associated structure is mounted upon the sub-panel 382 (Fig. 12) which is mounted on the back of the cycle counter panel 374. The energizing coils 247 for the reed 246 are mounted upon a core 383 which in turn is mounted on the sub-panel 382. The stationary contact which is adapted to cooperate with the tuned reed is adjustably mounted on the sub-panel 382 by means of the adjusting screws 384 passing through elongated slots on the stationary contact assembly 250. The lower end of the vibrating portion of the reed 246 is held between a stationary roll 385 mounted on the sub-panel 382 and a movable roll 386 which is carried at one end of an arm 387 which is fastened to the sub-panel 382 by means of a pivot pin 388. To the other end of said arm 387 is connected a bias spring 389 which keeps the movable roll 386 in contact with the lower end of the vibrating portion of the reed 246. In this way said reed 246 is firmly held between the rolls 385 and 386 so that the portion which extends above said rolls is free to vibrate. In order to control the length of the reed 246 which may be vibrated and thus to tune said reed to various frequencies, the lower end thereof is provided with a rack 390 which engages a pinion 391 mounted on a stub-shaft 392 which extends through the sub-panel 382 and the cycle counter panel 374 to the exterior thereof. The control 378 described above is mounted on said stub-shaft 392 as it emerges from the cycle counter panel 374. The rack 390 is kept further in engagement with the pinion 391 by a roll 339 mounted upon an arm 394. This arm 394 is pivoted to the sub-panel 382 by means of a pivot pin 395. The opposite end of the arm 394 is also connected to the spring 389, whereby the roll 393 is kept firmly in engagement with the lower end of the reed 246, and thus maintains the rack 390 in engagement with the pinion 391. The sub-panel 382 is mounted on the rear face of the cycle counter panel 374 by means of supporting studs 396. By means of the above structure, when the control member 378 is rotated, the reed 246 is moved up and down between the rolls 385 and 386, and varying lengths are permitted to vibrate freely. In this way the frequency of said reed is varied so as to accomplish the results described above in connection with Fig. 19.

Fig. 14 shows the cycle counter assembly mounted upon the cycle counter panel 374 as observed from the bottom thereof. The cycle counter itself is designated by the reference numeral 397. This may be of any suitable type which counts the number of revolutions imparted to its driving shaft. These revolutions are recorded on the indicating dials 375 described in connection with Fig. 11. The cycle counter 397 is mounted in a frame 398 which secures the cycle counter 397 to the cycle counter panel 374. Cycle counter 397 is provided with a driving shaft 399 connected through a resilient spring drive 400 to the shaft 401 of the cycle counter motor 217. The cycle counter motor 217 is also mounted on the frame 398. Preferably the cycle counter motor 217 is so geared to the cycle counter 397 that the number which appears on the indicating dials 375 represents hundreds of cycles of current supplied to the cycle counter motor 217. In order to allow re-setting of the cycle counter 397 to zero, it is provided with a re-setting shaft 405. The re-setting knob 376 described in connection with Fig. 11, is mounted on a shaft 402 extending through the cycle counter panel 374. The opposite end of said shaft 402 is connected by means of a chain drive 403 to the bevel gear train 404, which in turn drives the re-setting shaft 405 of the cycle counter 397. Thus, in order to re-set the cycle counter to zero at any time, the re-setting knob 376 is rotated.

The relay 225 which has been described above as being associated with the cycle counter motor 217 is also mounted on the frame 398, as shown in Fig. 14. The operating coil 224 is mounted, as shown, whereby when energized it closes the contacts 229 and 230, and brings the brake 228 into engagement with the cycle counter motor 217 so as to stop said cycle counter motor as described in connection with Fig. 19. A bias spring 406 normally holds the brake 228 away from the cycle counter motor 217, and also maintains the contacts 229 and 230 in their open position.

Operation

The operation of the machine, as described more fully above, may be summarized as follows, referring more particularly to Figs. 1 and 11. The test piece 1 is placed upon the node cushions 2 (Fig. 1). The main switch 285 (Fig. 11) is then closed, whereupon the operator will note that the pilot lamp 286 is lit. Further operation cannot be accomplished until the time relay circuit has had a chance to operate. During this time the operator will find it impossible to produce any vibration of the test piece 1, due to the fact that the coils of the vibrator unit are all deenergized. As soon as the time delay circuit has operated, a deflection will occur in the plate current meter 276, indicating to the operator that further adjustments may be made. The control member 98 is then regulated until the frequency of the currents fed to the vibrator unit is substantially the same as the resonance frequency of the test piece 1. When this happens, the test piece 1 begins to vibrate and the frequency of the oscillator is automatically fixed as described above. When the test piece 1 starts to vibrate, a deflection will occur in the amplitude meter 183. This meter reading enables the operator to determine when a proper adjustment of the control member 98 is reached. Of course, an additional indication is a visual observation of the test piece 1, the vibration of which can normally be readily observed. Once the test piece 1 has been set in vibration, the node cushions 2 may be adjusted to the nodal points and the pickup units 30 may be centered on opposite sides of said test piece.

The switches 178 are then manipulated until the plate current meter 276 reads a minimum value. When this occurs, the circuit of the alternating current excitation coils 11 will be tuned to substantially the frequency of the alternating currents supplied thereto. Such tuning will normally prevent an overloading of the power output tubes 166.

The operator then sets the control member 189 to zero, and adjusts the control member 127 until an amplitude somewhat in excess of that desired is indicated on the amplitude meter 183. The control member 189 is then adjusted so as to decrease the amplitude to the desired value, as indicated on the meter 183. This, as previously described, introduces the automatic amplitude control.

The switch 252 is then set in the "tune" position, and the control member 378 is regulated until the resonance indicator lamp 255 is lit. This indicates that the reed 246 is then tuned to the frequency of the vibrating test piece 1. The control member 378 is then adjusted to a slightly lower frequency until the resonance indicator lamp 255 is extinguished. The switch 252 is then set in the "normal" position and the test is permitted to continue. Throughout the running of the test, the number of cycles of vibration of the test piece 1 is registered in terms of hundreds of cycles on the indicating dial 375 of the cycle counter. The counting of these cycles may be started at any time throughout the tests by re-setting the indicating dials 375 to zero by means of the re-setting knob 376.

A measurement of the frequency of vibration of the test piece 1 is ordinarily desirable in order to determine the modulus of elasticity of said test piece. This frequency measurement is usually made at the beginning of the test. In order to conduct this frequency measurement, the control member 379 is set to select a predetermined time interval for the operation of the automatic timer. The switch 222 is then set in the "on" position at which time the reading of the indicating dials 375 is recorded. The operation of the automatic timer is thus initiated, and at the end of the time interval selected by the control member 379 the cycle counter will stop, as indicated by the indicating dial 375. Thus the total number of cycles which occur during the selected interval of time are readily determined from which the frequency of vibration can readily be calculated. The automatic timer switch 222 is then set in the "off" position, whereby the regular operation of the test can be continued.

As described above in connection with Fig. 19, when a fracture develops in the test piece 1, the machine is automatically shut off, and the total number of vibrations to which the test piece 1 has been subjected during said test is determined by a reading of the indicating dials 375.

Throughout the tests, the temperature of the vibrating test piece 1 can be determined from a reading of the temperature-indicating meter 81.

Modifications

Although the machine described above has produced a vibration of the test piece 1 in substantially one plane, it can be modified to produce a vibration of the test piece 1 in a plurality of planes. This may be done by disposing the operating coils of the vibrator unit with respect to the test piece 1, for example, as shown in Fig. 16. In this figure the node support 407 is modified so as to engage the test piece 1 throughout substantially its entire circumference. Disposed in one plane, for example a vertical plane, is the vertical vibrator magnet 408. This is provided with direct current polarization coils 410 which correspond to the direct current polarization coils 10 of Fig. 20. The magnet 408 is also provided with alternating current excitation coils 411 corresponding to the coils 11 in Fig. 20. In addition to the vertical vibrator magnet, there is provided in a plane substantially at right angles thereto, a horizontal vibrator magnet 409. This magnet is also provided with direct current polarizing coils 410 and with alternating current excitation coils 412. The direct current polarization coils 410 are supplied with direct current from a power supply source in substantially the same way as are the coils 10 in Figs. 20. In order to energize the alternating current excitation coils 411 and 412, there is provided a master oscillator 413 which is similar to the oscillator 82 and the associated controls as described in Fig. 19. A portion of the output of the oscillator 413 is amplified directly in an amplifier unit 414, and fed directly to the horizontal alternating current excitation coils 412. Another portion of the output of the oscillator 413 is led through a phase-shifting control unit 415 to another amplifier unit 416. The output of the amplifier unit 416 is then fed to the alternating current excitation coils 411. Due to this arrangement, the magnetic fields set up by the magnets 408 and 409 will be out of phase with each other, and therefore will produce a resultant rotating magnetic field which acts upon the test piece 1. Of course, it is to be understood that the arrangement, as shown in Fig. 16, is duplicated at the opposite end of the test piece 1. When the system as shown in Fig. 16 is set in operation, the ends of the test piece 1 will be vibrated in a circular or elliptical path, and in this way the test piece 1 will be subjected to substantially uniform stress throughout the circumference thereof.

Instead of imparting vibrating forces to the test piece by means of a magnetic field, as described above, such forces could be imparted in various other ways; for example, by an electrostatic field.

I have found that a separate oscillator tube, such as tube 82 in Fig. 19, can be eliminated and the test piece 1 can be made to serve as its own oscillator. Such an arrangement is illustrated diagrammatically in Fig. 22.

In this figure the voltage generated in the two pickup units 30 is fed through a phase-shifting device 417 to an amplifier 418. The amplifier 418 will amplify the output of the pickup units 30 substantially in the same manner as the various stages of amplification described in connection with Fig. 19. The output from the amplifier 418 may then be fed to the vibrator coils 10.

A test piece when supported as shown, for example, in Fig. 1, usually has a small degree of vibration which will set up a generated voltage in the pickup units 30, resulting in a power input to the vibrator coils 10 of the proper frequency when the arrangement as shown in Fig. 22 is used. In order that the phase relationships between the vibration of the test piece 1 and the current fed to the vibrator coils 10 be such as to assist the vibration of the test piece 1, the phase-shifting network 417 is provided. By a control member 420, any desired phase shift can be produced in the network 417, and in this way the proper phase of current may be fed to the vibrator coils 10. If the vibrations of the test piece 1 are insufficient to initiate the operation of the device, such initiation can be secured by striking the test piece 1, whereupon sufficient vibrations will be started to cause the operation described above to follow.

Although the amplitude-indicating meter 183 is described above as being connected through a reactor 182, substantially the same effect can be produced by the alternative arrangement as shown in Fig. 22. In this arrangement the amplitude-indicating meter 183 is connected directly across the ends of the secondary coil 181 of the amplitude-indicating transformer. Instead of the reactor 182, as shown in Fig. 19, a condenser 419 (Fig. 22) is connected across the terminals of the amplitude-indicating meter 183. Since the impedance of the condenser 419 varies inversely with frequency as the frequency of vibration of the test piece 1 increases, the condenser 419 will bypass increasing amounts of current across the meter 183. Thus, although the voltage generated in the pickup units 30 increases with an increase in the frequency of vibration, increased diversion of current from the meter 183 through the condenser 419 will tend to keep the current through the meter 183 constant with changing frequencies of vibration, provided the amplitude of vibration remains constant. It is to be understood that combinations of condensers and reactors in connection with the meter 183 may likewise be used to produce a similar result, namely, that of keeping the current through the meter 183 independent of the frequency of vibration of the test piece 1.

Although a limited number of variations have been described herein, it is to be understood that the invention is not limited to the particular details of construction herein illustrated, as many other equivalents will suggest themselves to those skilled in this art without departing from the spirit and scope of this invention.

What is claimed is:

1. A material-testing machine comprising means for supporting a test piece to be vibrated, vibrator means for causing said test piece to vibrate at its natural frequency, and regulating means responsive to the amplitude of vibration of said test piece to maintain said amplitude at a predetermined fixed value, said regulating means being out of contact with said test piece and inductively actuated thereby.

2. A material-testing machine comprising means for supporting a test piece to be vibrated, vibrator means energized by periodically varying electrical current for causing said test piece to vibrate at its natural frequency, supply means for supplying said electrical current to said vibrator means, and regulating means responsive to the amplitude of vibrations of said test piece and acting upon said supply means to maintain said amplitude at a predetermined fixed value, said regulating means being out of contact with said test piece and inductively actuated thereby.

3. A material-testing machine comprising means for supporting a test piece to be vibrated, vibrator means energized by periodically varying electrical current for causing said test piece to vibrate at its natural frequency, an oscillator for generating said electrical current, an amplifier for amplifying the output of said oscillator, means connecting the output of said amplifier to said vibrator means, and regulating means responsive to the amplitude of vibration of said test piece for varying the amplifying power of said amplifier inversely in accordance with said amplitude, whereby said amplitude is maintained at a fixed predetermined value.

4. A material-testing machine comprising means for supporting a test piece to be vibrated, vibrator means energized by periodically varying electrical current for causing said test piece to vibrate at its natural frequency, supply means for supplying said electrical current to said vibrator means, regulating means responsive to the amplitude of vibration of said test piece and acting upon said supply means to maintain said amplitude at a predetermined fixed value, said regulating means being out of contact with said test piece and inductively actuated thereby, and means for selecting the magnitude of response of said supply means to said regulating means, whereby the amplitude of vibration may be predetermined.

5. A material-testing machine comprising means for supporting a test piece to be vibrated, vibrator means energized by periodically varying electrical current for causing said test piece to vibrate at its natural frequency, an oscillator for generating said electrical current, an amplifier for amplifying the output of said oscillator, means connecting the output of said amplifier to said vibrator means, controlling means for varying the amplifying power of said amplifier inversely in accordance with the voltage impressed on said controlling means, means for generating a control voltage varying in accordance with variations in the amplitude of vibration of said test piece, and means for impressing said control voltage on said controlling means, whereby said amplitude is maintained at a fixed predetermined value.

6. A material-testing machine comprising means for supporting a test piece to be vibrated, vibrator means energized by periodically varying electrical current for causing said test piece to vibrate at its natural frequency, an oscillator for generating said electrical current, an amplifier for amplifying the output of said oscillator, means connecting the output of said amplifier to said vibrator means, controlling means for varying the amplifying power of said amplifier inversely in accordance with a voltage impressed on said controlling means, means for generating a control voltage varying in accordance with variations in the amplitude of vibration of said test piece, and means for impressing any desired portion of said control voltage on said controlling means, whereby said amplitude is maintained at a fixed and selectively predetermined value.

7. A material-testing machine comprising means for supporting a test piece to be vibrated, vibrator means for causing said test piece to vibrate at its natural frequency, means for generating a periodically-varying voltage whose frequency varies with the frequency of vibration of said test piece and whose magnitude varies in accordance with said frequency of vibration and with the amplitude of said vibration, and means for connecting said voltage in series with a current-measuring device through an impedance network, the impedance of said network being composed mainly of an inductance having a substantially straight line current flux characteristic for normal operating current values, whereby said impedance varies with the frequency of the currents passing through it to substantially the same degree as said generating means varies with said frequency of vibration to keep the current passing through said measuring device constant for each amplitude of vibration and independent of the frequency thereof.

8. A material-testing machine comprising means for supporting a test piece to be vibrated, vibrator means for causing said test piece to vibrate at its natural frequency, counting means for counting the number of vibrations of said test piece, means for causing said counting means to operate only during a predetermined fixed period of time, whereby the frequency of said vibration may be determined as the quotient of the number of vibrations recorded during said period divided by the length of said period.

9. A material-testing machine comprising means for supporting a test piece to be vibrated, vibrator means energized by periodically varying electrical current for causing said test piece to vibrate at its natural frequency, an oscillator for generating said electrical current at the natural frequency of said test piece, a synchronous motor driven by said oscillator, and a counter driven by said synchronous motor, whereby the cycles of vibration of said test piece may be counted.

10. A material-testing machine comprising means for supporting a test piece to be vibrated, vibrator means energized by periodically varying electrical current for causing said test piece to vibrate at its natural frequency, an oscillator for generating said electrical current at the natural frequency of said test piece, a synchronous motor driven by said oscillator, a counter driven by said synchronous motor, and means responsive to a predetermined change in the operating characteristics of said test piece to stop the operation of said oscillator, whereby the energization of the vibrator means ceases and the counter stops, thus automatically indicating the number of cycles of vibration of the test piece from the start of the test run.

11. A material-testing machine comprising means for supporting a test piece to be vibrated, vibrator means energized by periodically varying electrical current for causing said test piece to vibrate at its natural frequency, an oscillator for generating said electrical current at the natural frequency of said test piece, a synchronous motor driven by said oscillator, a counter driven by said synchronous motor, and means responsive to a predetermined drop in the natural frequency of said test piece to stop the operation of said oscillator, whereby upon the development of a fracture in said test piece, the energization of the vibrator means ceases and the counter stops, thus automatically indicating the number of cycles of vibration of the test piece from the start of the test run.

12. A material-testing machine comprising means for supporting a test piece to be vibrated, vibrator means energized by periodically varying electrical current for causing said test piece to vibrate at its natural frequency, an oscillator for generating said electrical current at the natural frequency of said test piece, a vibrating reed driven by said oscillator, means for adjusting the natural frequency of said reed so that it may be tuned to the frequency of said oscillator, a first means responsive to a predetermined amplitude of vibration of said reed to produce a signal, thus giving an indication of when the reed has been tuned to the frequency of said oscillator, alternative means responsive to a predetermined amplitude of vibration of said reed to stop the operation of said vibrator means, and means for alternatively causing either of said first means and alternative means to become operative.

13. A material-testing machine comprising means for supporting a test piece to be vibrated, vibrator means energized by periodically varying electrical current for causing said test piece to vibrate at its natural frequency, an oscillator for generating said electrical current at the natural frequency of said test piece, a vibrating reed driven by said oscillator, means for adjusting the natural frequency of said reed so that it may be tuned to the frequency of said oscillator, lamp means responsive to a predetermined amplitude of vibration of said reed to produce a visual signal, thus giving an indication of when the reed has been tuned to the frequency of said oscillator, alternative means responsive to a predetermined amplitude of vibration of said reed to stop the operation of said vibrator means, and means for alternatively causing either of said lamp means and said alternative means to become operative.

14. A material-testing machine comprising means for supporting a test piece to be vibrated, vibrator means energized by periodically varying electrical current for causing said test piece to vibrate at its natural frequency, an oscillator for generating said electrical current at the natural frequency of said test piece, a vibrating reed driven by said oscillator, means for adjusting the natural frequency of said reed so that it may be tuned to the frequency of said oscillator, lamp means responsive to a predetermined amplitude of vibration of said reed to produce a visual signal, thus giving an indication of when the reed has been tuned to the frequency of said oscillator, means responsive to a predetermined amplitude of vibration of said reed to stop the operation of said vibrator means, and means for selectively rendering either of said last two means operative.

15. A material-testing machine comprising two spaced nodal-supporting means upon which a test piece is adapted to be rested, a vibrator magnet adapted to be energized by periodically varying electrical current supported adjacent each nodal-supporting means and adapted to cause said test piece to vibrate at its natural frequency, a bed member, a carriage, each nodal supporting means and its associated vibrator magnet being mounted on said carriage, said carriage being mounted on said bed member and adjustable thereon, and means for adjusting said carriage along said bed member, whereby said nodal-supporting members may be moved to those points along said test piece at which the nodes occur during said vibration and said vibrator magnets simultaneously brought into proper relationship with said test piece to perform their vibrator function.

16. A material-testing machine comprising means for supporting a test piece to be vibrated, vibrator means for causing said test piece to vibrate at its natural frequency, two pickup units disposed on opposite sides of said test piece at a point where said vibrations occur, each pickup unit comprising a magnetic core carrying a generating coil, said test piece being adapted to vary the magnetic flux through said cores upon movement of said test piece, whereby a voltage is generated in each of said coils upon the occurrence of said vibration, said coils being connected in series in a direction to cause said voltages so generated to be added, and means responsive to the total voltage for producing a response to the amplitude of vibration of said test piece.

17. A material-testing machine comprising means for supporting a test piece to be vibrated, vibrator means for causing said test piece to vibrate at its natural frequency, two pickup units disposed on opposite sides of said test piece at a point where said vibrations occur, each pickup unit comprising a magnetic core carrying a generating coil, said test piece being adapted to vary the magnetic flux through said cores upon movement of said test piece, whereby a voltage is generated in each of said coils upon the occurrence of said vibration, said coils being connected in series in a direction to cause said voltages so generated to be added, means responsive to the total voltage for producing a response to the amplitude of vibration of said test piece, and adjusting means for selectively spacing said pickup units a limited number of definitely fixed predetermined distances apart.

18. A material-testing machine comprising means for supporting a test piece to be vibrated, vibrator means for causing said test piece to vibrate at its natural frequency, two pickup units disposed on opposite sides of said test piece at a point where said vibrations occur, each pickup unit comprising a magnetic core carrying a generating coil, said test piece being adapted to vary the magnetic flux through said cores upon movement of said test piece, whereby a voltage is generated in each of said coils upon the occurrence of said vibration, said coils being connected in series in a direction to cause said voltages so generated to be added, means responsive to the total voltage for producing a response to the amplitude of vibration of said test piece, adjusting means for selectively spacing said pickup units a limited number of definitely fixed predetermined distances apart, and means for moving said pickup units simultaneously as a unit with respect to said test piece, whereby said pickup units may be centered on opposite sides of said test piece.

19. A material-testing machine comprising means for supporting a test piece to be vibrated, vibrator means for causing said test piece to vibrate at its natural frequency, two pickup units disposed on opposite sides of said test piece at a point where said vibrations occur, each pickup unit comprising a magnetic core carrying a generating coil, two magnetic armatures carried by said test piece and spaced a fixed distance apart, each of said armatures being located adjacent one of said pickup units, whereby the magnetic fluxes through said cores are varied upon movement of said test piece and a voltage is generated in each of said coils upon the occurrence of said vibration, said coils being connected in series in a direction to cause said voltages so generated to be added, and means responsive to the total voltage for producing a response to amplitude of vibration of said test piece.

FRITZ A. GROSS.